US012755394B2

(12) United States Patent
Yoon et al.

(10) Patent No.: US 12,755,394 B2
(45) Date of Patent: Oct. 6, 2026

(54) MODELING SECONDARY MOTION BASED ON THREE-DIMENSIONAL MODELS

(71) Applicant: Adobe Inc., San Jose, CA (US)

(72) Inventors: Jae shin Yoon, San Jose, CA (US); Zhixin Shu, San Jose, CA (US); Yangtuanfeng Wang, London (GB); Jingwan Lu, Sunnyvale, CA (US); Jimei Yang, Mountain View, CA (US); Duygu Ceylan Aksit, London (GB)

(73) Assignee: Adobe Inc., San Jose, CA (US)

( * ) Notice: Subject to any disclaimer, the term of this patent is extended or adjusted under 35 U.S.C. 154(b) by 54 days.

(21) Appl. No.: 18/057,436

(22) Filed: Nov. 21, 2022

(65) Prior Publication Data

US 2024/0169553 A1 May 23, 2024

(51) Int. Cl.
*G06T 7/20* (2017.01)
*G06T 13/40* (2011.01)
*G06T 15/04* (2011.01)
*G06T 17/00* (2006.01)

(52) U.S. Cl.
CPC ................ *G06T 7/20* (2013.01); *G06T 13/40* (2013.01); *G06T 15/04* (2013.01); *G06T 17/00* (2013.01); *G06T 2207/10016* (2013.01); *G06T 2207/20081* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS 6,262,409 B1 * 7/2001 Avaro ........................ G06T 7/97 250/559.27
8,988,422 B1 * 3/2015 Hodgins ................. G06T 13/40 345/475
2005/0052461 A1 * 3/2005 Vassilev .................. G06T 13/40 345/473

(Continued)

OTHER PUBLICATIONS

Albahar, Badour et al., "Pose with Style: Detail-Preserving Pose-Guided Image Synthesis with Conditional StyleGAN", Cornell University arXiv, arXiv.org [retrieved Feb. 19, 2023]. Retrieved from the Internet <https://arxiv.org/pdf/2109.06166.pdf>., Aug. 10, 2022, 11 Pages.

(Continued)

*Primary Examiner* — Aaron M Richer
(74) *Attorney, Agent, or Firm* — FIG. 1 Patents

(57) ABSTRACT

Techniques for modeling secondary motion based on three-dimensional models are described as implemented by a secondary motion modeling system, which is configured to receive a plurality of three-dimensional object models representing an object. Based on the three-dimensional object models, the secondary motion modeling system determines three-dimensional motion descriptors of a particular three-dimensional object model using one or more machine learning models. Based on the three-dimensional motion descriptors, the secondary motion modeling system models at least one feature subjected to secondary motion using the one or more machine learning models. The particular three-dimensional object model having the at least one feature is rendered by the secondary motion modeling system.

20 Claims, 18 Drawing Sheets

(56) References Cited

U.S. PATENT DOCUMENTS

| | | | | |
|---|---|---|---|---|
| 2009/0033654 A1* | 2/2009 | Sikka | G06T 15/00 | 715/863 |
| 2013/0114858 A1* | 5/2013 | Allezard | G06F 18/25 | 382/103 |
| 2015/0269291 A1* | 9/2015 | Sekine | G06F 30/20 | 703/1 |
| 2018/0240280 A1* | 8/2018 | Chen | G06T 19/20 | |
| 2022/0237866 A1* | 7/2022 | Stein | G06T 17/00 | |
| 2022/0284663 A1* | 9/2022 | Ha | G06T 19/20 | |
| 2022/0383582 A1* | 12/2022 | Chen | G06T 15/06 | |
| 2023/0115531 A1* | 4/2023 | Zohar | G06T 7/251 | 345/418 |
| 2023/0131418 A1* | 4/2023 | Hong | G06V 10/774 | 382/100 |
| 2023/0135234 A1* | 5/2023 | Wang | G06V 10/82 | 382/103 |
| 2023/0196685 A1* | 6/2023 | Assouline | G06T 19/006 | 345/633 |
| 2024/0242366 A1* | 7/2024 | Cole | G06T 7/55 | |

OTHER PUBLICATIONS

Bagautdinov, Timur et al., "Driving-Signal Aware Full-Body Avatars", Cornell University arXiv, arXiv.org [retrieved Aug. 31, 2022]. Retrieved from the Internet <https://arxiv.org/pdf/2105.10441.pdf>., Jun. 25, 2021, 17 Pages.

Balakrishnan, Guha et al., "Synthesizing Images of Humans in Unseen Poses", Cornell University arXiv, arXiv.org [retrieved Feb. 19, 2023]. Retrieved from the Internet <https://arxiv.org/pdf/1804.07739.pdf>., Apr. 20, 2018, 9 Pages.

Blanz, Volker et al., "A Morphable Model for the Synthesis of 3D Faces", Proceedings of the 26th annual conference on Computer graphics and interactive techniques [retrieved Aug. 31, 2022]. Retrieved from the Internet <https://redwood.berkeley.edu/wp-content/uploads/2018/08/Blanz-siggraph-99.pdf>., Jul. 1, 1999, 8 Pages.

Cao, Zhe et al., "OpenPose: Realtime Multi-Person 2D Pose Estimation using Part Affinity Fields", Cornell University, arXiv Preprint, arXiv.org [retrieved Feb. 19, 2023]. Retrieved from the Internet <https://arxiv.org/pdf/1812.08008>., Dec. 18, 2018, 14 pages.

Casas, Dan et al., "4D video textures for interactive character appearance", Computer Graphics Forum, vol. 33, No. 2 [retrieved Aug. 31, 2022]. Retrieved from the Internet <https://citeseerx.ist.psu.edu/viewdoc/download?doi=10.1.1.675.7880&rep=rep1&type=pdf>., Jun. 1, 2014, 10 Pages.

Chan, Caroline et al., "Everybody Dance Now", Cornell University arXiv, arXiv.org [retrieved Aug. 29, 2022]. Retrieved from the Internet <https://arxiv.org/pdf/1808.07371.pdf>., Aug. 27, 2019, 12 Pages.

Chen, Jianchuan et al., "Animatable Neural Radiance Fields from Monocular RGB Videos", Cornell University arXiv, arXiv.org [retrieved Aug. 31, 2022]. Retrieved from the Internet <https://arxiv.org/pdf/2106.13629.pdf>., Sep. 7, 2021, 12 Pages.

Choutas, Vasileios et al., "Monocular Expressive Body Regression through Body-Driven Attention", Cornell University arXiv, arXiv.org [retrieved Aug. 31, 2022]. Retrieved from the Internet <https://arxiv.org/pdf/2008.09062.pdf>., Aug. 20, 2020, 45 Pages.

Chu, Mengyu et al., "Learning Temporal Coherence via Self-Supervision for GAN-based Video Generation", Cornell University arXiv, arXiv.org [retrieved Aug. 31, 2022]. Retrieved from the Internet <https://arxiv.org/pdf/1811.09393.pdf>., May 21, 2020, 19 Pages.

Collet, Alvaro et al., "High-quality streamable free-viewpoint video", ACM Transactions on Graphics, vol. 34, No. 4 [retrieved Aug. 31, 2022]. Retrieved from the Internet <https://hhoppe.com/fvv.pdf>., Jul. 27, 2015, 13 Pages.

Dong, Haoye et al., "Towards Multi-pose Guided Virtual Try-on Network", arXiv.org [retrieved Aug. 31, 2022]. Retrieved from the Internet <https://arxiv.org/pdf/1902.11026.pdf>., Feb. 28, 2019, 11 pages.

Esser, Patrick et al., "A Variational U-Net for Conditional Appearance and Shape Generation", Cornell University arXiv, arXiv.org [retrieved Aug. 31, 2022]. Retrieved from the Internet <https://arxiv.org/pdf/1804.04694.pdf>., Apr. 12, 2018, 21 Pages.

Gafni, Oran et al., "Single-Shot Freestyle Dance Reenactment", Cornell University arXiv, arXiv.org [retrieved Aug. 31, 2022]. Retrieved from the Internet <https://arxiv.org/pdf/2012.01158.pdf>., Mar. 21, 2021, 15 Pages.

Gao, Chen et al., "Dynamic View Synthesis from Dynamic Monocular Video", Cornell University arXiv, arXiv.org [retrieved Aug. 31, 2022]. Retrieved from the Internet <https://arxiv.org/pdf/2105.06468.pdf>., May 13, 2021, 11 Pages.

Gong, Ke et al., "Instance-level human parsing via part grouping network", Cornell University arXiv, arXiv.org [retrieved Aug. 31, 2022]. Retrieved from the Internet <https://arxiv.org/pdf/1808.00157.pdf>., Aug. 1, 2018, 17 Pages.

Grigorev, Artur et al., "Coordinate-based Texture Inpainting for Pose-Guided Image Generation", Cornell University arXiv, arXiv.org [retrieved Aug. 31, 2022]. Retrieved from the Internet <https://arxiv.org/pdf/1811.11459.pdf>., Jul. 19, 2019, 10 Pages.

Güler, Riza A. et al., "DensePose: Dense Human Pose Estimation in the Wild", Cornell University, arXiv Preprint, arxiv.org [retrieved Feb. 19, 2023]. Retrieved from the Internet <https://arxiv.org/pdf/1802.00434.pdf>., Feb. 2018, 12 Pages.

Habermann, Marc et al., "Real-time Deep Dynamic Characters", Cornell University arXiv, arXiv.org [retrieved Aug. 31, 2022]. Retrieved from the Internet <https://arxiv.org/pdf/2105.01794.pdf>., Aug. 31, 2021, 16 Pages.

Han, Xintong et al., "ClothFlow: A Flow-Based Model for Clothed Person Generation", ICCV 2019 open access [retrieved Feb. 19, 2023]. Retrieved from the Internet <https://asset-pdf.scinapse.io/prod/2991079364/2991079364.pdf>., Nov. 2019, 10 Pages.

Isola, Phillip et al., "Image-to-Image Translation with Conditional Adversarial Networks", 2017 IEEE Conference on Computer Vision and Pattern Recognition (CVPR) [retrieved Feb. 19, 2023]. Retrieved from the Internet <https://gangw.web.illinois.edu/class/cs598/papers/CVPR17-img2img.pdf>., Nov. 22, 2017, 17 pages.

Jafarian, Yasamin et al., "Learning High Fidelity Depths of Dressed Humans by Watching Social Media Dance Videos", Cornell University arXiv, arXiv.org [retrieved Aug. 31, 2022]. Retrieved from the Internet <https://arxiv.org/pdf/2103.03319v1.pdf>., Mar. 4, 2021, 15 Pages.

Jain, Eakta et al., "Augmenting hand animation with three-dimensional secondary motion", Proceedings of the 2010 ACM SIGGRAPH/Eurographics Symposium on Computer Animation [retrieved Aug. 31, 2022]. Retrieved from the Internet <https://www.ri.cmu.edu/pub_files/2010/7/c8284fda2e0af274e7015a8c806491bd.pdf>., Jul. 2, 2010, 11 Pages.

Kanazawa, Angjoo et al., "End-to-end Recovery of Human Shape and Pose", Cornell University arXiv, arXiv.org [retrieved Aug. 31, 2022]. Retrieved from the Internet <https://arxiv.org/pdf/1712.06584.pdf>., Jun. 23, 2018, 10 Pages.

Kappel, Moritz et al., "High-fidelity neural human motion transfer from monocular video", Cornell University arXiv, arXiv.org [retrieved Aug. 31, 2022]. Retrieved from the Internet <https://arxiv.org/pdf/2012.10974.pdf>., Dec. 20, 2020, 14 Pages.

Karras, Tero et al., "A Style-Based Generator Architecture for Generative Adversarial Networks", Cornell University arXiv, arXiv.org [retrieved Feb. 2, 2023]. Retrieved from the Internet <https://arxiv.org/pdf/1812.04948.pdf>., Mar. 29, 2019, 12 pages.

Kingma, Diederik P. et al., "Auto-Encoding Variational Bayes", Cornell University arXiv, arXiv.org [retrieved Aug. 31, 2022]. Retrieved from the Internet <https://arxiv.org/pdf/1312.6114.pdf>., May 1, 2014, 14 Pages.

Kocabas, Muhammed et al., "VIBE: Video Inference for Human Body Pose and Shape Estimation", Cornell University arXiv, arXiv.org [retrieved Aug. 31, 2022]. Retrieved from the Internet <https://arxiv.org/pdf/1912.05656.pdf>., Apr. 29, 2020, 12 Pages.

Kolotouros, Nikos et al., "Learning to Reconstruct 3D Human Pose and Shape via Model-fitting in the Loop", Cornell University arXiv, arXiv.org [retrieved Aug. 31, 2022]. Retrieved from the Internet <https://arxiv.org/pdf/1909.12828.pdf>., Sep. 27, 2019, 10 pages.

(56) References Cited

OTHER PUBLICATIONS

Lewis, J. P. , "Pose space deformation: A unified approach to shape interpolation and skeleton-driven deformation", Proceedings of the 27th annual conference on Computer graphics and interactive techniques [retrieved Aug. 31, 2022]. Retrieved from the Internet <http://chrisevans3d.com/files/reference/PSD.pdf>., Jul. 1, 2000, 8 Pages.
Li, Kun et al., "SPA: Sparse Photorealistic Animation Using a Single RGB-D Camera", IEEE Transactions on Circuits and Systems for Video Technology, vol. 27, No. 4 [retrieved Aug. 31, 2022]. Retrieved from the Internet <https://web.archive.org/web/20180722230029id_/http://orca.cf.ac.uk/88715/9/07457365.pdf>., Apr. 2017, 14 Pages.
Li, Ruilong et al., "AI Choreographer: Music Conditioned 3D Dance Generation with AIST++", Cornell University arXiv, arXiv.org [retrieved Aug. 31, 2022]. Retrieved from the Internet <http://128.84.4.34/pdf/2101.08779>., Jul. 31, 2021, 15 Pages.
Li, Zhengqi et al., "Neural Scene Flow Fields for Space-Time View Synthesis of Dynamic Scenes", Cornell University arXiv, arXiv.org [retrieved Feb. 19, 2023]. Retrieved from the Internet <https://arxiv.org/pdf/2011.13084.pdf>., Apr. 21, 2021, 11 Pages.
Liu, Lingjie et al., "Neural Actor: Neural Free-view Synthesis of Human Actors with Pose Control", Cornell University arXiv, arXiv.org [retrieved Feb. 19, 2023]. Retrieved from the Internet <https://arxiv.org/pdf/2106.02019.pdf>., Jan. 4, 2022, 16 Pages.
Liu, Lingjie et al., "Neural Rendering and Reenactment of Human Actor Videos", Cornell University arXiv, arXiv.org [retrieved Aug. 31, 2022]. Retrieved from the Internet <https://arxiv.org/pdf/1809.03658.pdf>., May 9, 2019, 14 Pages.
Loper, Matthew et al., "SMPL: a skinned multi-person linear model", ACM Transactions on Graphics, vol. 34, No. 6 [retrieved Feb. 19, 2023]. Retrieved from the Internet <https://www.researchgate.net/publication/287815055_SMPL_a_skinned_multi-person_linear_model>., Nov. 2, 2015, 16 Pages.
Ma, Liqian et al., "Pose Guided Person Image Generation", Proceedings of the 31st International Conference on Neural Information Processing Systems [retrieved Feb. 19, 2023]. Retrieved from the Internet <https://charliememory.github.io/pdf/NIPS17_Ma_Pose_Guided_Person_Image_Generation.pdf>., Dec. 4, 2017, 11 Pages.
Ma, Qianli et al., "SCALE: Modeling Clothed Humans with a Surface Codec of Articulated Local Elements", Cornell University arXiv, arXiv.org [retrieved Sep. 6, 2022]. Retrieved from the Internet <https://arxiv.org/pdf/2104.07660.pdf>., Apr. 15, 2021, 17 Pages.
Men, Yifang et al., "Controllable Person Image Synthesis with Attribute-Decomposed GAN", Cornell University arXiv, arXiv.org [retrieved Feb. 19, 2023]. Retrieved from the Internet <https://arxiv.org/pdf/2003.12267.pdf>., Jul. 19, 2020, 10 Pages.
Mildenhall, Ben et al., "NeRF: Representing Scenes as Neural Radiance Fields for View Synthesis", Cornell University arXiv, arXiv.org [retrieved Sep. 6, 2022]. Retrieved from the Internet <https://arxiv.org/pdf/2003.08934.pdf>., Aug. 3, 2020, 25 Pages.
Neverova, Natalia et al., "Dense Pose Transfer", Cornell University arXiv, arXiv.org [retrieved Sep. 6, 2022]. Retrieved from the Internet <https://arxiv.org/pdf/1809.01995.pdf>., Sep. 6, 2018, 20 Pages.
Park, Keunhong et al., "Deformable neural radiance fields", Cornell University arXiv, arXiv.org [retrieved Sep. 6, 2022]. Retrieved from the Internet <https://arxiv.org/pdf/2011.12948v2.pdf>., Nov. 26, 2020, 12 Pages.
Park, Keunhong et al., "HyperNeRF: A Higher-Dimensional Representation for Topologically Varying Neural Radiance Fields", Cornell University arXiv, arXiv.org [retrieved Sep. 6, 2022]. Retrieved from the Internet <https://arxiv.org/pdf/2106.13228.pdf>., Sep. 10, 2021, 16 Pages.
Peng, Sida et al., "Animatable Neural Radiance Fields for Human Body Modeling", Cornell University arXiv, arXiv.org [retrieved Sep. 6, 2022]. Retrieved from the Internet <https://arxiv.org/pdf/2105.02872v1.pdf>., May 6, 2021, 10 Pages.
Prokudin, Sergey et al., "SMPLpix: Neural Avatars from 3D Human Models", Cornell University arXiv, arXiv.org [retrieved Sep. 6, 2022]. Retrieved from the Internet <https://arxiv.org/pdf/2008.06872.pdf>., Nov. 9, 2020, 10 Pages.
Pumarola, Albert et al., "D-NeRF: Neural Radiance Fields for Dynamic Scenes", Cornell University arXiv, arXiv.org [retrieved Sep. 6, 2022]. Retrieved from the Internet <https://arxiv.org/abs/2011.13961>., Nov. 27, 2020, 10 Pages.
Pumarola, Albert et al., "Unsupervised Person Image Synthesis in Arbitrary Poses", Cornell University arXiv, arXiv.org [retrieved Sep. 6, 2022]. Retrieved from the Internet <https://arxiv.org/pdf/1809.10280.pdf>., Sep. 27, 2018, 9 Pages.
Raj, Amit et al., "ANR: Articulated Neural Rendering for Virtual Avatars", Cornell University arXiv, arXiv.org [retrieved Sep. 6, 2022]. Retrieved from the Internet <https://arxiv.org/pdf/2012.12890.pdf>., Dec. 23, 2020, 10 Pages.
Ravi, Nikhila et al., "Accelerating 3D Deep Learning with PyTorch3D", Cornell University arXiv, arXiv.org [retrieved Sep. 6, 2022]. Retrieved from the Internet <https://arxiv.org/pdf/2007.08501.pdf>., Jul. 16, 2020, 18 Pages.
Ren, Yurui et al., "Deep Image Spatial Transformation for Person Image Generation", Cornell University arXiv, arXiv.org [retrieved Feb. 19, 2023]. Retrieved from the Internet <https://arxiv.org/pdf/2003.00696.pdf>., Mar. 18, 2020, 17 Pages.
Sarkar, Kripasindhu et al., "Neural Re-Rendering of Humans from a Single Image", Cornell University arXiv, arXiv.org [retrieved Sep. 6, 2022]. Retrieved from the Internet <https://arxiv.org/pdf/2101.04104.pdf>., Jan. 11, 2021, 22 Pages.
Shysheya, Aliaksandra et al., "Textured Neural Avatars", Cornell University arXiv, arXiv.org [retrieved Sep. 6, 2022]. Retrieved from the Internet <https://arxiv.org/pdf/1905.08776.pdf>., May 21, 2019, 11 Pages.
Siarohin, Aliaksandr et al., "First Order Motion Model for Image Animation", Cornell University arXiv, arXiv.org [retrieved Sep. 6, 2022]. Retrieved from the Internet <https://arxiv.org/pdf/2003.00196.pdf>., Oct. 1, 2020, 20 Pages.
Simonyan, Karen et al., "Very Deep Convolutional Networks for Large-Scale Image Recognition", arXiv Preprint, Cornell University, arXiv.org [retrieved Feb. 19, 2023]. Retrieved from the Internet <https://arxiv.org/pdf/1409.1556.pdf>., Sep. 2014, 14 pages.
Song, Sijie et al., "Unsupervised Person Image Generation with Semantic Parsing Transformation", Cornell University arXiv, arXiv.org [retrieved Feb. 19, 2023]. Retrieved from the Internet <https://arxiv.org/pdf/1904.03379.pdf>., Apr. 18, 2019, 10 Pages.
Tang, Hao et al., "XingGAN for Person Image Generation", Cornell University arXiv, arXiv.org [retrieved Sep. 6, 2022]. Retrieved from the Internet <https://arxiv.org/pdf/2007.09278.pdf>., Jul. 17, 2020, 22 Pages.
Tretschk, Edgar et al., "Non-Rigid Neural Radiance Fields: Reconstruction and Novel View Synthesis of a Dynamic Scene From Monocular Video", Cornell University arXiv, arXiv.org [retrieved Sep. 6, 2022]. Retrieved from the Internet <https://arxiv.org/pdf/2012.12247.pdf>., Aug. 23, 2021, 20 Pages.
Volino, Marco et al., "Optimal Representation of Multi-View Video", Proceedings British Machine Vision Conference [retrieved Sep. 6, 2022]. Retrieved from the Internet <https://cvssp.org/projects/4d/optirep/volino_BMVC14.pdf>., 2014, 12 Pages.
Wang, Chaoyang et al., "Neural Trajectory Fields for Dynamic Novel View Synthesis", Cornell University arXiv, arXiv.org [retrieved Sep. 6, 2022]. Retrieved from the Internet <https://arxiv.org/pdf/2105.05994.pdf>., May 12, 2021, 12 Pages.
Wang, Ting-Chun et al., "Few-shot Video-to-Video Synthesis", Cornell University arXiv, arXiv.org [retrieved Sep. 6, 2022]. Retrieved from the Internet <https://arxiv.org/pdf/1910.12713.pdf>., Oct. 28, 2019, 14 Pages.
Wang, Ting-Chun et al., "High-Resolution Image Synthesis and Semantic Manipulation With Conditional GANs", Cornell University, arXiv, arXiv.org [retrieved Aug. 29, 2022]. Retrieved from the Internet <https://openaccess.thecvf.com/content_cvpr_2018/CameraReady/0768.pdf>., Nov. 2017, 10 Pages.

(56) References Cited

OTHER PUBLICATIONS

Wang, Ting-Chun et al., "Video-to-Video Synthesis", Cornell University arXiv, arXiv.org [retrieved Sep. 6, 2022]. Retrieved from the Internet <https://arxiv.org/pdf/1808.06601.pdf>., Dec. 3, 2018, 14 pages.
Wang, Tuanfeng Y. et al., "Dance in the Wild: Monocular Human Animation with Neural Dynamic Appearance Synthesis", Cornell University arXiv, arXiv.org [retrieved Aug. 29, 2022]. Retrieved from the Internet <https://arxiv.org/pdf/2111.05916.pdf>., Nov. 10, 2021, 10 Pages.
Wang, Zhou et al., "Image Quality Assessment: From Error Visibility to Structural Similarity", IEEE Transactions on Image Processing, vol. 13, No. 4 [retrieved Jan. 30, 2023]. Retrieved from the Internet <http://www.cns.nyu.edu/pub/lcv/wang03-preprint.pdf>., Apr. 2004, 14 pages.
Xian, Wenqi et al., "Space-time Neural Irradiance Fields for Free-Viewpoint Video", Cornell University arXiv, arXiv.org [retrieved Sep. 6, 2022]. Retrieved from the Internet <https://arxiv.org/pdf/2011.12950.pdf>., Jun. 18, 2021, 12 Pages.
Xiang, Donglai et al., "Explicit Clothing Modeling for an Animatable Full-Body Avatar", Cornell University arXiv, arXiv.org [retrieved Sep. 6, 2022]. Retrieved from the Internet <https://arxiv.org/pdf/2106.14879v2.pdf>., Jun. 30, 2021, 14 Pages.
Xu, Yuanlu et al., "DenseRaC: Joint 3D Pose and Shape Estimation by Dense Render- and-Compare", Cornell University arXiv, arXiv.org [retrieved Sep. 6, 2022]. Retrieved from the Internet <http://128.84.4.34/pdf/1910.00116>., Oct. 9, 2019, 11 Pages.
Yang, Ceyuan et al., "Pose Guided Human Video Generation", Cornell University arXiv, arXiv.org [retrieved Sep. 6, 2022]. Retrieved from the Internet <https://arxiv.org/pdf/1807.11152.pdf>., Jul. 30, 2018, 16 Pages.
Yoon, Jae Shin et al., "Pose-Guided Human Animation From a Single Image in the Wild", Cornell University arXiv, arXiv.org [retrieved Sep. 6, 2022]. Retrieved from the Internet <https://arxiv.org/pdf/2012.03796.pdf>., Nov. 22, 2021, 14 Pages.
Zhang, Meng et al., "Dynamic neural garments", Cornell University arXiv, arXiv.org [retrieved Sep. 6, 2022]. Retrieved from the Internet <https://arxiv.org/pdf/2102.11811.pdf>., Feb. 23, 2021, 13 Pages.
Zhang, Richard et al., "The Unreasonable Effectiveness of Deep Features as a Perceptual Metric", Cornell University arXiv, arXiv.org [retrieved Feb. 19, 2023]. Retrieved from the Internet <https://arxiv.org/pdf/1801.03924.pdf>., Apr. 10, 2018, 14 Pages.
Zhu, Zhen et al., "Progressive Pose Attention Transfer for Person Image Generation", Cornell University arXiv, arXiv.org [retrieved Feb. 19, 2023]. Retrieved from the Internet <https://arxiv.org/pdf/1904.03349.pdf>., May 13, 2019, 21 Pages.

* cited by examiner

1600

MODELING SECONDARY MOTION BASED ON THREE-DIMENSIONAL MODELS

BACKGROUND

Secondary motion is motion of a secondary object induced by motion of a primary object to which the secondary object is physically connected. One example of secondary motion includes motion of articles of clothing induced by motion of a human who is wearing the articles of clothing. Content processing systems are often implemented to learn the dynamics of secondary motion based on motion depicted in digital videos, and render synthesized motion based on the learned dynamics. However, conventional techniques involve a prohibitive amount of training data to learn and render plausible secondary motion, e.g., digital videos of an object in motion captured by many different cameras and from many different viewpoints. Moreover, synthesized secondary motion rendered by these conventional techniques is prone to overfitting, particularly when trained on a limited amount of training data.

SUMMARY

Techniques for modeling secondary motion based on three-dimensional models are described to render plausible secondary motion based on learned secondary motion dynamics. In an example, a computing device implements a secondary motion modeling system to receive an input video depicting an object in motion and including digital images corresponding to different frames of the input video. Using a machine learning pose predictor model, the secondary motion modeling system generates a plurality of three-dimensional object models representing the object in corresponding digital images. Based on the three-dimensional object models, a machine learning encoder model is employed to generate three-dimensional motion descriptors each capturing a surface normal and one or more velocities of a point on the surface of a target three-dimensional object model.

Features that are to be mapped to corresponding portions of the target three-dimensional object model are received by the secondary motion modeling system, including at least one feature that is subject to secondary motion. Based on the three-dimensional motion descriptors, a machine learning shape decoder model is employed to generate a two-dimensional shape of the at least one feature subjected to secondary motion. Furthermore, a machine learning appearance decoder model is employed to determine surface normals of the at least one feature subjected to secondary motion based on the two-dimensional shape and the three-dimensional motion descriptors. The two-dimensional shape of the at least one feature and the surface normals of the at least one feature are combined to generate a final appearance of the at least one feature. The secondary motion modeling system maps the features to the corresponding portions of the target three-dimensional object model to generate a synthesized representation of the object that includes the at least one feature subjected to secondary motion.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
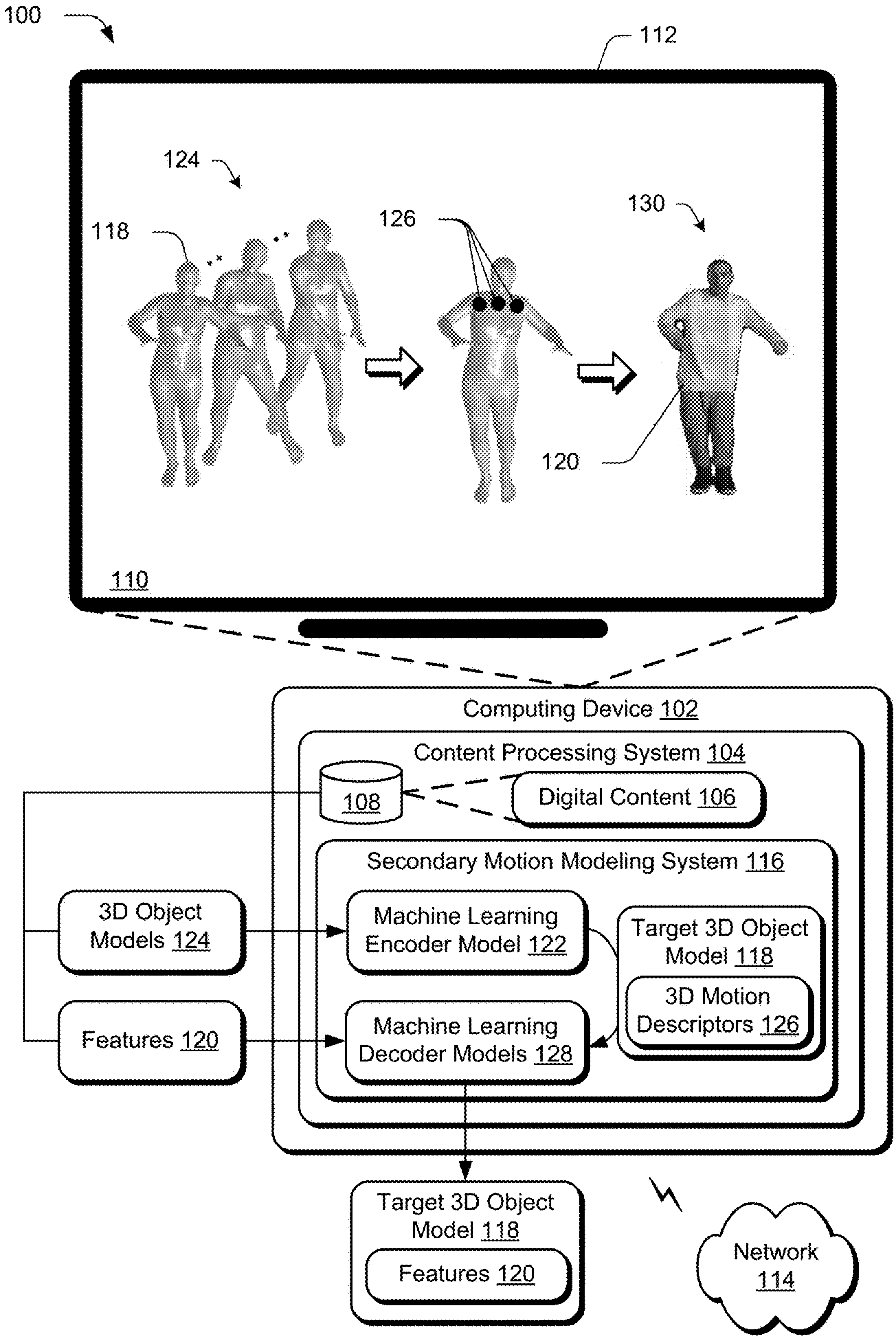
FIG. 1 is an illustration of an environment in an example implementation that is operable to employ techniques for modeling secondary motion based on three-dimensional object models described herein.

Content processing systems are often implemented for motion synthesis tasks, which in some instances, involve learning the motion of an object depicted in one or more digital videos, and rendering a synthesized video of the object based on the learned motion. Oftentimes, the one or more digital videos depict secondary motion, which is motion of a secondary object that is induced by motion of a primary object to which the secondary object is physically connected. One of the foremost challenges in motion synthesis is learning the dynamics of secondary motion. Conventional motion synthesis techniques use two-dimensional models and two-dimensional motion as a basis for learning the dynamics of secondary motion. However, two-dimensional object models and two-dimensional motion are subject to inherent depth ambiguity and lack an ability to generalize to data that is not included as part of training, e.g., object poses rendered from unseen viewpoints.

As a result, these conventional techniques involve a prohibitive amount of training data to learn and render plausible secondary motion, e.g., digital videos of an object in motion captured by many different cameras and from many different viewpoints. Moreover, synthesized secondary motion rendered by these conventional techniques is prone to overfitting, particularly when trained on a limited amount of training data. Accordingly, techniques for modeling secondary motion based on three-dimensional models are described herein to generate a synthesized motion video that includes plausible secondary motion while utilizing a reduced amount of training data, as compared to conventional techniques, e.g., a single digital video captured by a single camera that is less than sixty seconds in length.

In an example, a secondary motion modeling system receives an input video of a dressed human in motion that includes a plurality of digital images corresponding to different frames of the input video. The secondary motion modeling system leverages a machine learning pose predictor model to generate a plurality of three-dimensional object models representing the human in corresponding digital images of the input video. During training, the machine learning pose predictor model learns to predict object pose parameters and camera pose parameters for a digital image that are usable to generate three-dimensional object models representing the human depicted in the digital image.

Based on the plurality of three-dimensional object models, the secondary motion modeling system determines three-dimensional surface normals and three-dimensional velocities for a target three-dimensional object model. To do so, the secondary motion modeling system determines a surface normal for each individual point on the surface of the target three-dimensional object model. In particular, the surface normal for a respective point is determined as a spatial derivative of the target three-dimensional object model at the respective point. In addition, the secondary motion modeling system determines multiple velocities for each individual point on the surface of the target three-dimensional object model. In particular, the multiple velocities are determined as temporal derivatives of the target three-dimensional object model over multiple preceding time steps. By way of example, the multiple velocities for a respective point capture a first rate of change of the respective point between the target object model and a first preceding object model depicting the human in an earlier frame of the input video, a second rate of change of the respective point between the first preceding object model and a second preceding object model depicting the human in an even earlier frame of the input video, and so on.

The secondary motion modeling system employs a machine learning encoder model to generate three-dimensional motion descriptors based on the determined surface normals and velocities. Notably, the three-dimensional motion descriptors are generated for each individual point on the surface of the target three-dimensional object model and capture the surface normal for the respective point, the velocities for the respective point over the multiple time steps, and a direction for the three-dimensional motion descriptor.

The secondary motion modeling system further receives features that are to be mapped to the target three-dimensional object model, including at least one feature that is subject to secondary motion. By way of example, the secondary motion modeling system receives a plurality of features, such as skin, facial features, articles of clothing, and hair, which are to be mapped to corresponding portions of the target object model. The features include features that are subject to secondary motion, e.g., hair and articles of clothing. The secondary motion modeling system is additionally configured to model these features as being subjected to secondary motion. In a specific example in which the features include a shirt, the secondary motion modeling system is configured to model an appearance of the shirt subjected to secondary motion and map the shirt to the torso and arms of the target object model.

In this specific example, the secondary motion modeling system employs a machine learning shape decoder model to generate a two-dimensional shape of the shirt subjected to secondary motion based on the three-dimensional motion descriptors. The two-dimensional shape of the shirt captures the silhouette deformations in the shirt. In addition, the secondary motion modeling system employs a machine learning appearance decoder model to generate an appearance of the shirt subjected to secondary motion based on the two-dimensional shape of the shirt and the three-dimensional motion descriptors. To do so, the machine learning appearance decoder model initially determines surface normals for the shirt which capture the local geometric changes in the shirt, such as folds and wrinkles. Moreover, the machine learning appearance decoder model generates a final appearance of the shirt by combining the two-dimensional shape of the shirt (e.g., a first intermediate representation of the shirt) and the surface normals of the shirt, e.g., a second intermediate representation of the shirt. In this way, the final appearance or final representation of the shirt captures both the silhouette deformations and the local geometric changes in the shirt.

The secondary motion modeling system then maps the shirt to the corresponding portion of the target three-dimensional object model. The other features are similarly modeled and mapped to corresponding portions of the object model. In subsequent iterations, the secondary motion modeling system similarly maps and models the features to three-dimensional object models representing the object depicted in subsequent frames of the input video. Thus, over multiple iterations, the secondary motion modeling system generates a synthesized motion video of the dressed human that includes dynamic secondary motion.

By utilizing the three-dimensional object models as a basis for modeling secondary motion, the described techniques alleviate depth ambiguity challenges encountered by conventional techniques which utilize two-dimensional object models. Moreover, in contrast to conventional techniques, the three-dimensional motion descriptors map to object poses rendered from multiple different viewpoints. As a result, the secondary motion modeling system generates a plausible synthesized motion video that includes dynamic secondary motion using a reduced amount of training data than conventional techniques (e.g., a single video of an object in motion captured from a single viewpoint that is less than sixty seconds in length) while reducing instances of overfitting.

In the following discussion, an example environment is described that employs the techniques described herein. Example procedures are also described that are performable in the example environment as well as other environments.

Consequently, performance of the example procedures is not limited to the example environment and the example environment is not limited to performance of the example procedures.

Example Environment

FIG. 1 is an illustration of an environment 100 in an example implementation that is operable to employ techniques for modeling secondary motion based on three-dimensional object models described herein. The illustrated environment 100 includes a computing device 102, which is configurable in a variety of ways. The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 16.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud."

An example of functionality incorporated by the content processing system 104 to process the digital content 106 is illustrated as a secondary motion modeling system 116. In general, the secondary motion modeling system 116 is configured to render a target three-dimensional object model 118 of the digital content 106 having one or more features 120 that are modeled that are subjected to secondary motion.

To do so, a machine learning encoder model 122 receives a plurality of time-varying three-dimensional object models 124, including the target three-dimensional object model 118. In the illustrated example, for instance, a plurality of three-dimensional object models 124 are received which represent a human figure in motion. In one or more implementations, the three-dimensional object models 124 are generated from a digital video of the digital content 106, and as such, the different three-dimensional object models 124 are representative of the object depicted at different time instances during the digital video. By way of example, the target three-dimensional object model 118 represents the human figure at a first time instance (i.e., at a first frame of the input video), a second one of the three-dimensional object models 124 represents the human figure at a second time instance (i.e., at a second frame of the input video), and so on.

Based on the received three-dimensional object models 124, the machine learning encoder model 122 is configured to encode three-dimensional motion descriptors 126 for the target three-dimensional object model 118. The three-dimensional motion descriptors 126 describe three-dimensional surface normals and three-dimensional velocities of corresponding portions of the target three-dimensional object model 118. In the illustrated example, for instance, the three-dimensional motion descriptors 126 are each disposed on a corresponding portion of the target three-dimensional object model 118 and each describe a three-dimensional surface normal and one or more three-dimensional velocities of the corresponding portion. Although a limited number of three-dimensional motion descriptors 126 are depicted in the illustrated example for illustrative purposes, it is to be appreciated that the three-dimensional motion descriptors 126 cover the entire surface of the target three-dimensional object model 118 in accordance with one or more implementations.

The target three-dimensional object model 118 including the three-dimensional motion descriptors 126 are received, as input, by one or more machine learning decoder models 128. In addition, the machine learning decoder models 128 receive one or more features 120 of the digital content 106 that are to be mapped to the target three-dimensional object model 118. In accordance with the described techniques, at least one of the features 120 is subject to secondary motion. Generally, secondary motion is motion of a secondary object that is generated as a reaction to motion of a primary object to which the secondary object is physically connected. Examples of features 120 that are subject to secondary motion resulting from primary motion of the human figure include, but are not limited to, clothing of the human figure and hair of the human figure, etc.

The machine learning decoder models 128 are configured to model the at least one feature 120 subjected to the secondary motion using the three-dimensional motion descriptors 126. To do so, a first modular function of the machine learning decoder models 128 generates a two-dimensional shape of the features 120 subjected to secondary motion based on the three-dimensional motion descriptors 126. In an example in which the features 120 subject to secondary motion include clothing items, the two-dimensional shape of the features 120 represent a silhouette or outline of the clothing items as worn by the human figure. Based on the two-dimensional shape of the features 120 and the three-dimensional motion descriptors 126, a second modular function of the machine learning decoder models 128 is leveraged to determine surface normals of the features 120 subjected to the secondary motion. Continuing with the previous example in which the features 120 subject to secondary motion include clothing items, the surface normals capture the local geometric changes in the clothing items, such as folds and wrinkles. To generate a final appearance of the features 120 subjected to secondary motion, the second modular function of the machine learning decoder models 128 combines the generated shape and the determined surface normals of the features 120.

In accordance with the described techniques, the secondary motion modeling system 116 outputs a final representation 130 of the target three-dimensional object model 118 by mapping the modeled features 120 subjected to secondary motion to corresponding portions of the target three-dimensional object model 118. As shown in the illustrated example, for instance, the final representation 130 of the target three-dimensional object model 118 includes one or more clothing features 120 that are subjected to secondary motion.

Conventional techniques utilize two-dimensional models and two-dimensional motion as a basis for modeling secondary motion. However, two-dimensional models are subject to inherent depth ambiguity. Indeed, conventional techniques often confuse the direction of out-of-plane object rotation, e.g., whether a portion of the object is rotating towards, or away from a camera capturing an input video. Furthermore, two-dimensional models entangle the viewpoint from which an object was captured and a pose of the object into a single feature, and as such, two-dimensional motion features lack an ability to generalize to unseen poses and viewpoints. Due to these factors, a prohibitive amount of training data (e.g., many digital videos of an object in motion captured by many digital cameras and from many different viewpoints) is typically required for these conventional techniques to generate plausible secondary motion. Moreover, secondary motion modeled based on two-dimensional motion is prone to overfitting, particularly when trained on a limited amount of training data.

In contrast, the described techniques utilize the three-dimensional object models 124 and three-dimensional motion descriptors 126 as a basis for modeling secondary motion. The three-dimensional object models 124 have increased accuracy in capturing a direction of out-of-plane body motion, as compared to conventional two-dimensional models. Further, the three-dimensional motion descriptors 126 map to object poses rendered from multiple different viewpoints, e.g., object poses and secondary motion that are not previously processed as part of training the machine learning models 122, 128. Thus, by using the three-dimensional motion descriptors 126 encoded from the three-dimensional object models 124 as a basis for modeling secondary motion, the described techniques learn and render plausible secondary motion from a reduced amount of training data, as compared to conventional techniques (e.g., a single video of an object in motion captured by a single digital camera from a single viewpoint that is less than sixty seconds in length) while reducing instances of overfitting.

Moreover, by leveraging two separate modular functions of the machine learning decoder models 128 to generate the two-dimensional shapes of the features 120 and determine the surface normals of the features 120, the secondary motion modeling system 116 trains the two modular functions separately. By doing so, the secondary motion modeling system 116 renders secondary motion having increased plausibility, as compared to conventional techniques which utilize a singular function to predict a final appearance. Furthermore, the determined surface normals of the features 120 enable applications, such as image-based relighting, that are not possible for conventional techniques which fail to generate intermediate surface normal representations of the features 120.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Secondary Motion Modeling Features

The following discussion describes techniques for modeling secondary motion based on three-dimensional object models that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-14 in parallel with a procedure 1500 of FIG. 15.

Figure 2A:
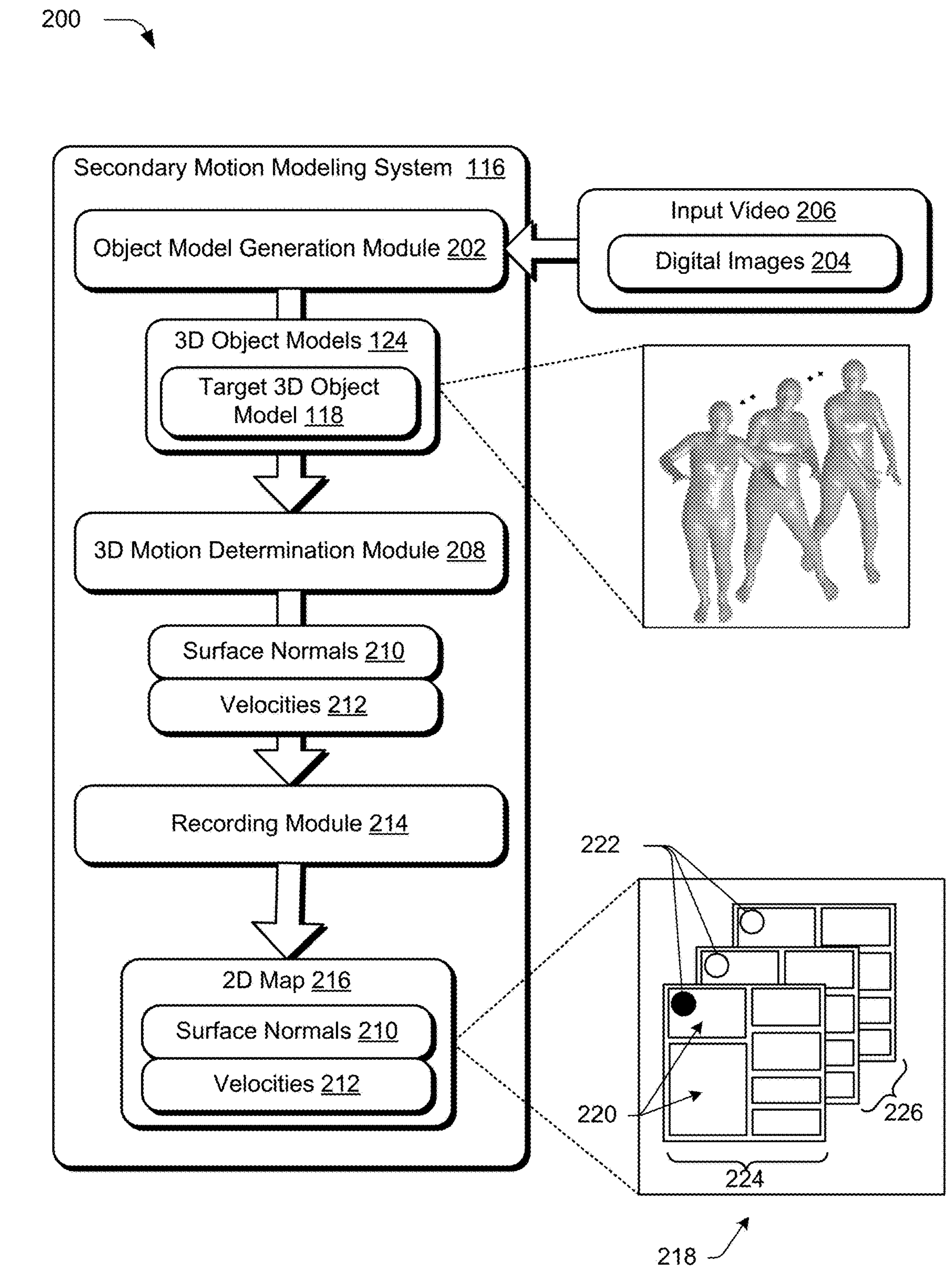
FIGS. 2*a* and 2*b* depict a system in an example implementation showing operation of a machine learning encoder model.
Figure 2B:
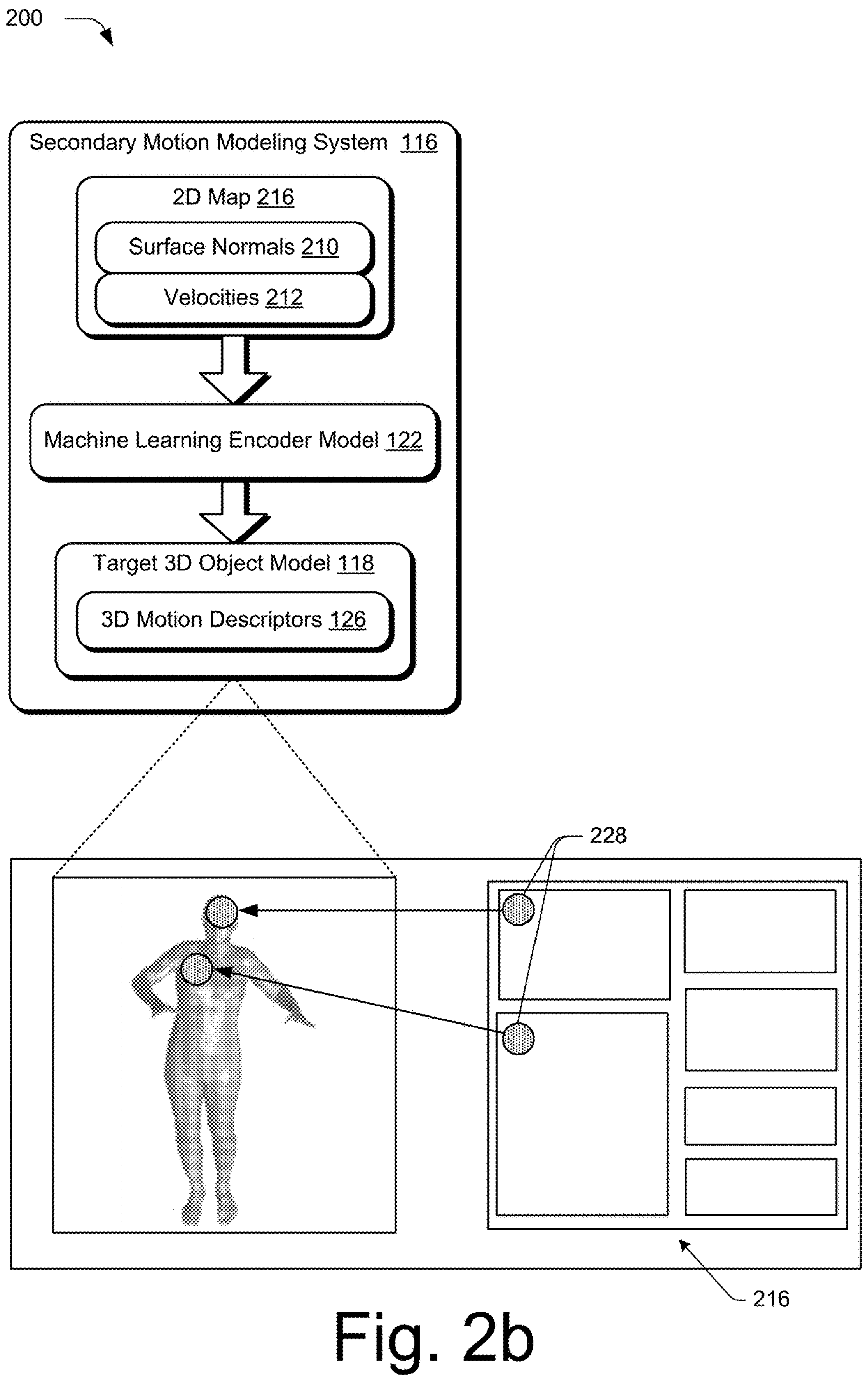

FIGS. 2*a* and 2*b* depict a system 200 in an example implementation showing operation of a machine learning encoder model 122. As shown in FIG. 2*a*, the secondary motion modeling system 116 includes an object model generation module 202, which is configured to receive a plurality of digital images 204 depicting an object (block 1502). The digital images 204 are included as part of an input video 206 depicting the object in motion. By way of example, different digital images 204 depict the object in different frames of the input video 206. In one or more implementations, the input video 206 is a monocular input video, e.g., a video captured by a single camera. Although the object is described and depicted herein as a human figure, it is to be appreciated that the object can be any one of a variety of object types, including but not limited to, animal figures and inanimate objects.

In accordance with the described techniques, the object model generation module 202 generates a plurality of three-dimensional object models 124 representing the object depicted in corresponding digital images 204 using a machine learning pose predictor model (block 1504). Further discussion of operation and training of the machine learning pose predictor model is provided below with reference to FIG. 6. The three-dimensional object models 124 are time-varying such that each subsequent three-dimensional object model 124 represents the object depicted one time step (e.g., one frame, one millisecond, one second, etc.) later than a preceding three-dimensional object model 124.

Broadly, the secondary motion modeling system 116 is configured to encode three-dimensional motion descriptors 126 of a target three-dimensional object model 118 based on the plurality of three-dimensional object models 124 and using a machine learning encoder model 122 (block 1506). To do so, the three-dimensional object models 124, including the target three-dimensional object model 118, are received by a three-dimensional motion determination module 208. The target three-dimensional object model 118 is one of the plurality of three-dimensional object models 124 for which the features 120 are modeled in a current iteration of the secondary motion modeling system 116.

In implementations, the three-dimensional motion determination module 208 determines three-dimensional surface normals 210 of corresponding portions of the target three-dimensional object model 118. Given a point on the surface of the target three-dimensional object model 118, for instance, the three-dimensional motion determination module 208 determines a three-dimensional surface normal 210 for the point. The surface normal 210 determined for the point is a directional vector that is perpendicular to the surface of the target three-dimensional object model 118 at a location on the object surface corresponding to the point. Notably, the surface normal of the point is determined as a spatial derivative of the target three-dimensional object model 118 at the location on the object surface corresponding to the point. Therefore, the surface normals 210 are representable as $$N = \frac{\partial p}{\partial x} \in \mathbb{R}^{m \times 3},$$

in which N represents the three-dimensional surface normals 210, which are taken as spatial derivatives, $$\frac{\partial p}{\partial x},$$

of the plurality of points, m, on the surface of the target three-dimensional object model 118.

The three-dimensional motion determination module 208 is further configured to determine three-dimensional velocities 212 of corresponding portions of the target three-dimensional object model 118. Given a point on the surface of the target three-dimensional object model 118, for instance, the three-dimensional motion determination module 208 determines three-dimensional velocities 212 of the point over multiple preceding time steps. By way of example, the three-dimensional motion determination module 208 determines a first velocity 212 based on a difference in position of the point between the target three-dimensional object model 118 (e.g., corresponding to time instance (t) during the input video 206) and a first preceding three-dimensional object model 124, e.g., corresponding to time instance (t−1) during the input video 206. Further, the three-dimensional motion determination module 208 determines a second velocity 212 of the point based on a difference in position of the point between the first preceding three-dimensional object model 124 and a second preceding three-dimensional object model 124 (e.g., corresponding to time instance (t−2) during the input video 206), and so on. In various examples, the three-dimensional motion determination module 208 determines velocities for a respective point over any number of time steps, e.g., over ten separate time steps.

The velocities 212 of a respective point are determined as temporal derivatives of the three-dimensional object models 124 at the location on the object surface corresponding to the point over each of the multiple time steps. Therefore, the velocities 212 of the target three-dimensional object model 118 are representable as $$V = \frac{\partial p}{\partial t} \in \mathbb{R}^{m \times 3},$$

in which V represents the three-dimensional velocities, which are taken as temporal derivatives, $$\frac{\partial p}{\partial t}$$

over the multiple time steps of the plurality of points, m, on the surface of the target three-dimensional object model 118. Notably, the determined velocities 212 include both magnitude as well as three-dimensional direction.

In accordance with the described techniques, a recording module 214 is employed to record the determined surface normals 210 and the determined velocities 212 in a spatially aligned two-dimensional map 216. To do so, a geometric transformation function is leveraged to warp the target three-dimensional object model 118 to a two-dimensional UV map 216 in which each pixel represents an individual point on the surface of the three-dimensional object model 118. Once the two-dimensional map 216 of the target three-dimensional object model 118 is generated, the determined surface normals 210 and the determined velocities 212 are recorded in corresponding pixels of the two-dimensional map 216.

As shown in a non-limiting example 218, the two-dimensional map 216 is segmented into patches 220. In one or more implementations, the patches 220 are representative of portions of the object that move independently of the other portions of the object. In the illustrated example in which the object is a human figure, the patches of the two-dimensional map represent different body parts of the human figure. By way of example, the different patches of the two-dimensional map 216 represent a head, a torso, right arm, left arm, right hand, left hand, right leg, left leg, right foot, left foot, etc. Further, the example 218 includes a pixel 222 representative of an individual point on the surface of the three-dimensional object model 118. As shown at 224, the surface normal 210 determined for the location on the surface of the target three-dimensional object model 118 is recorded in the corresponding pixel 222. Further, as shown at 226, the velocities 212 determined for the location on the surface of the target three-dimensional object model 118 over the multiple time steps are recorded in the corresponding pixel 222.

As shown in FIG. 2*b*, the two-dimensional map 216 is received by the machine learning encoder model 122, which is configured to encode a plurality of three-dimensional motion descriptors 126 for the target three-dimensional object model 118. In one or more examples, the machine learning encoder model 122 includes one or more convolutional neural networks trained to encode the three-dimensional motion descriptors 126 based on the two-dimensional map 216, as further discussed below with reference to FIG. 5.

Each three-dimensional motion descriptor 126 represents an individual point on the surface of the target three-dimensional object model 118 and includes the surface normal 210 determined for the individual point, the velocities 212 determined for the individual point over the multiple time steps, and a three-dimensional direction for the motion descriptor 126. In one or more implementations, the machine learning encoder model 122 leverages two-dimensional local convolutional operations to capture the relationship between neighboring portions of the target three-dimensional object model 118, as represented by the different patches 220 of the two-dimensional map 216. The determined three-dimensional motion descriptors 126 are recorded in the two-dimensional map 216. As shown, the two-dimensional map 216 includes pixels 228 which represent individual points on the surface of the target three-dimensional object model 118 and are encoded with three-dimensional motion descriptors 126.

In some examples, the three-dimensional motion descriptors 126 are represented as $f_{3D}=E_{\Delta}(W^{-1}N, W^{-1}V)$. As discussed above, N represents the surface normals 210 and V represents the velocities 212 determined for the target three-dimensional object model 118. Further, W represents the geometric transformation function which is leveraged to warp a three-dimensional object model 124 to a two-dimensional UV map representation. Given this, $W^{-1}N$ and $W^{-1}V$ represent the surface normals 210 and the velocities 212 recorded in the two-dimensional map 216 of the target three-dimensional object model 118. Furthermore, $E_\Delta$ represents the machine learning encoder model 122 configured to determine the three-dimensional motion descriptors 126, $f_{3D}$, recorded in the two-dimensional map 216.

The machine learning encoder model 122 is further employed to project the pixels 228 of the two-dimensional map 216 onto the target three-dimensional object model 118. To do so, the machine learning encoder model leverages a coordinate transformation function which projects the encoded pixels 228 of the two-dimensional map to corresponding locations on the target three-dimensional object model 118 in the image plane. For example, the projected three-dimensional motion descriptors 126 are represented as $f=\Pi W f_{3D}$, in which $\Pi$ is the coordinate transformation function that transports the three-dimensional motion features defined in the UV space, $f_{3D}$, to the target three-dimensional object model 118 in the image plane.

Figure 3:
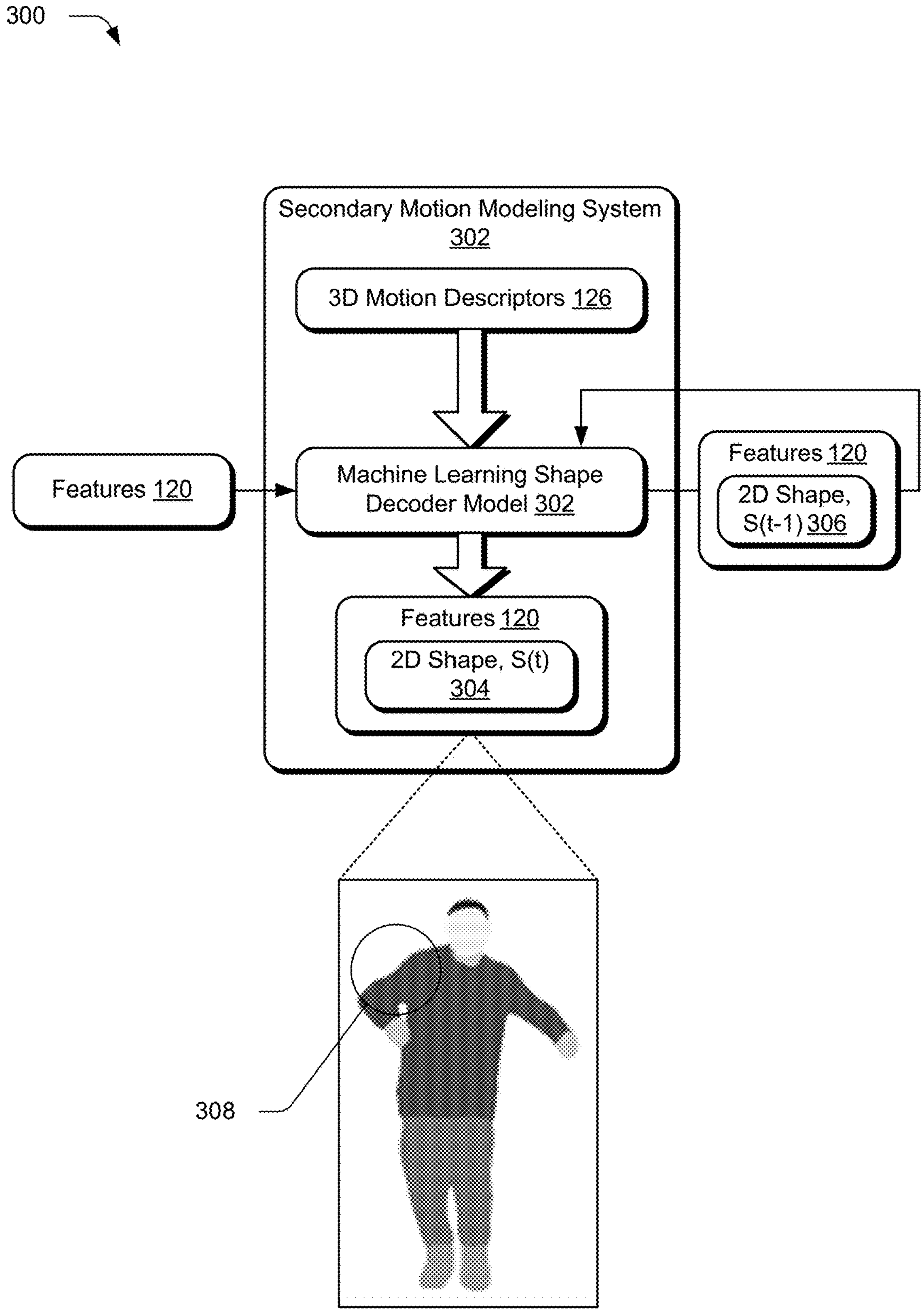
FIG. 3 depicts a system in an example implementation showing operation of a machine learning shape decoder model.

FIG. 3 depicts a system 300 in an example implementation showing operation of a machine learning shape decoder model 302. The machine learning shape decoder model 302 receives features 120 that are to be applied to the target three-dimensional object model 118, including at least one feature 120 that is subject to secondary motion (block 1508). In the illustrated example in which the object is a human figure, the features include a background, an item of top clothing, an item of bottom clothing, facial features, hair, skin, shoes, etc. In this example, the features 120 that are subject to secondary motion as a result of motion of the human figure include the item of top clothing, the item of bottom clothing, and hair.

Broadly, the machine learning shape decoder model 302 generates two-dimensional shapes 304 of the features 120 subjected to secondary motion based on the three-dimensional motion descriptors 126 (block 1510). For example, the two-dimensional shapes 304 of the features are represented as $\hat{s}_t=D_s(\hat{s}_{t-1}; f_t)$, in which the machine learning shape decoder model 302, $D_s$, generates the two-dimensional shapes 304 of the features 120, $\hat{s}_t$, based on input data including the three-dimensional motion descriptors 126, $f_t$, projected onto the target three-dimensional object model 118 and the two-dimensional shapes 306 of the features modeled for a three-dimensional object model 124 of a previous time instance, $\hat{s}_{t-1}$. The machine learning shape decoder model 302 is trained to generate two-dimensional shapes 304 of features 120 subjected to secondary motion based on the received input data, as further discussed below with reference to FIG. 5.

The two-dimensional shapes 304 of the features 120, for instance, are generated based on the three-dimensional motion descriptors 126 of the portion of the object to which the features 120 are to be applied. In an example in which the features 120 include a shirt, the two-dimensional shape 304 of the shirt is based on the surface normals 210, the velocities 212, and the direction encoded in the three-dimensional motion descriptors 126 of the torso and the arms of the target three-dimensional object model 118. By determining the two-dimensional shape 304 of the features 120, the machine learning shape decoder model 302 captures the silhouette deformations for the features 120. By way of example, as shown at 308, the two-dimensional shape 304 of the shirt applied to the target three-dimensional object model 118 captures the fine deformations in the silhouette or outline of the shirt induced by motion of the human figure.

Figure 4:
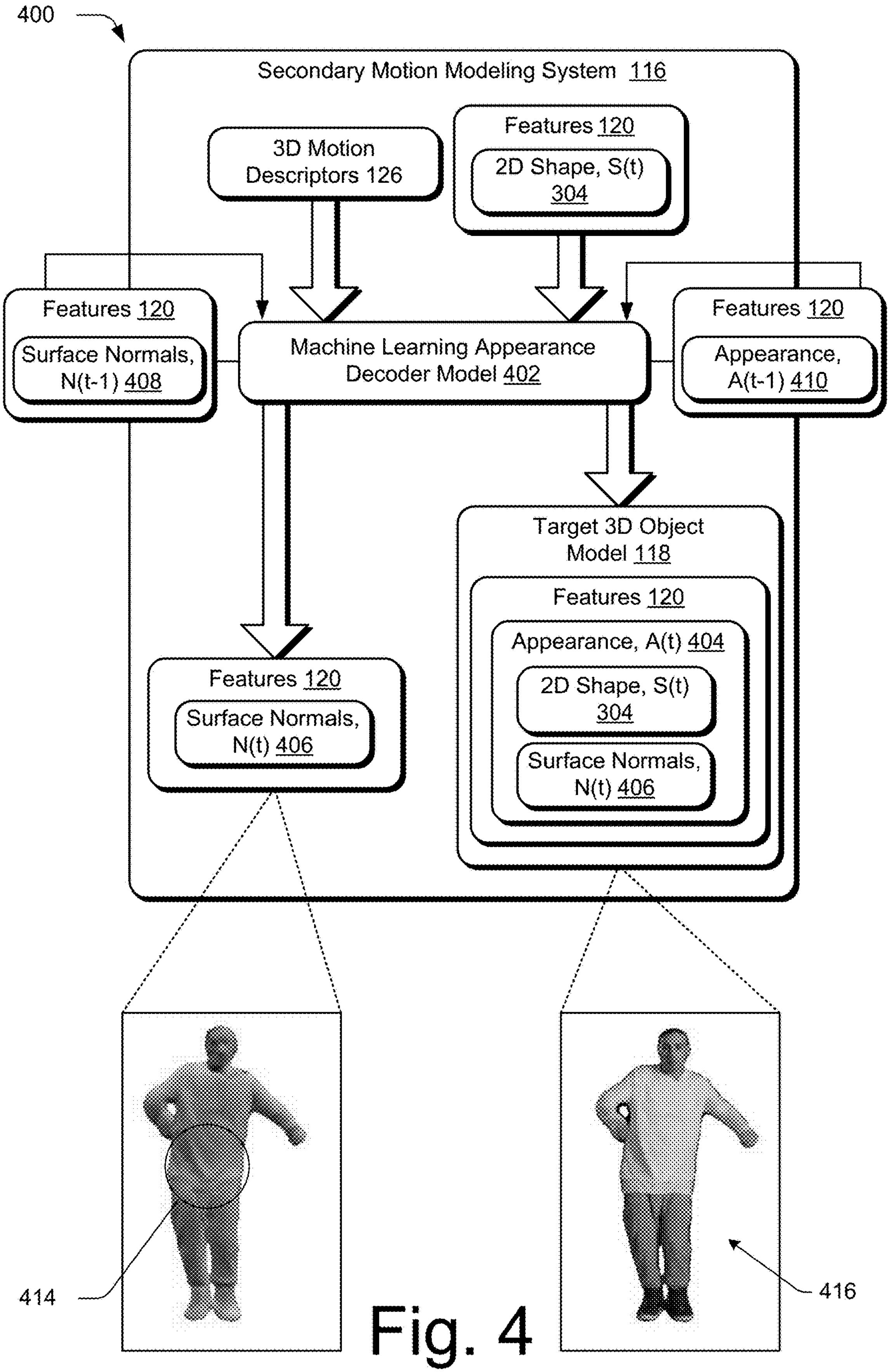
FIG. 4 depicts a system in an example implementation showing operation of a machine learning appearance decoder model.

FIG. 4 depicts a system 400 in an example implementation showing operation of a machine learning appearance decoder model 402. Broadly, the machine learning appearance decoder model 402 is configured to generate appearances 404 of the features 120. As part of the generating the appearances 404 of the features 120, the machine learning appearance decoder model 402 is configured to determine surface normals 406 of the features 120 subjected to the secondary motion based on the two-dimensional shape 304 and the three-dimensional motion descriptors 126 (block 1512). To do so, the machine learning appearance decoder model 402 receives, as input data, the three-dimensional motion descriptors 126 of the target three-dimensional object model 118, the two-dimensional shapes 304 of the features 120, surface normals 408 of the features 120 modeled for a three-dimensional object model 124 of a previous time instance, and appearances 410 of the features 120 modeled for a three-dimensional object model 124 of a previous time instance. Based on the received input data, the machine learning appearance decoder model 402 determines a surface normal 406 for each point on the surface of a respective feature 120.

The surface normals 406, for instance, are determined based on the three-dimensional motion descriptors 126 of the portion of the object to which the features 120 are to be applied. In an example in which the features 120 include a pair of pants, the surface normals 406 of the pair of pants are based on the surface normals 210, the velocities 212, and the direction encoded in the three-dimensional motion descriptors 126 of the legs of the target three-dimensional object model 118. By determining the surface normals 406 for each point on the surface of the features 120, the machine learning appearance decoder model 402 captures local geometric changes in the features 120, such as folds and wrinkles in clothing features 120 as shown at 414.

As part of generating the appearance 404 of the features 120, the machine learning appearance decoder model 402 is further configured to combine the two-dimensional shape 304 and the surface normals 406 of the features 120 (block 1514). Given a respective feature 120, for instance, the two-dimensional shape 304 constitutes a first intermediate representation of the feature 120, and the surface normals 406 constitute a second intermediate representation of the feature 120. To generate a final representation or a final appearance 404 of the feature 120, the machine learning appearance decoder model combines the first intermediate representation and the second intermediate representation. By doing so, the final appearance 404 of a respective feature 120 captures both the silhouette deformations and the local geometric changes of the respective feature 120.

In one or more examples, the appearances 404 and surface normals 406 of the features 120 are represented as $\hat{A}_t, \hat{n}_t=D_a(\hat{A}_{t-1}, \hat{n}_{t-1}, \hat{s}_t, f_t)$ in which the machine learning appearance decoder model, $D_a$, determines appearances, $\hat{A}_t$, and surface normals, $\hat{n}_t$, of the features 120. The determination is based on input data including the three-dimensional motion descriptors 126, $f_t$, the two-dimensional shapes 304, $\hat{s}_t$, of the features 120, and the surface normals 408, $\hat{n}_{t-1}$, and the appearances 410, $\hat{A}_{t-1}$, of the features 120 modeled for a three-dimensional object model 124 of a previous time instance. The machine learning appearance decoder model 402 is trained to generate the appearances 404 and surface normals 406 of the features 120 subjected to secondary motion based on the received input data, as further discussed below with reference to FIG. 5.

In accordance with the described techniques, the secondary motion modeling system 116 renders the target three-dimensional object model 118 having the features 120 (block 1516). By way of example, the secondary motion modeling system 116 maps the features 120 having the generated appearance 404 to corresponding portions of the target three-dimensional object model 118. In the illustrated example in which the object is a human figure and the features 120 include a shirt, the secondary motion modeling system 116 maps the shirt to the torso and arms of the target three-dimensional object model 118.

Therefore, the secondary motion modeling system 116 renders a final representation 416 of the target three-dimensional object model 118 having the one or more features 120 subjected to secondary motion, e.g., for display in the user interface 110 of the computing device 102. Notably, the final representation 416 corresponds to the object depicted at a specific time instance during the input video 206. In subsequent iterations, the secondary motion modeling system 116 renders three-dimensional object models 124 representing the object at subsequent time instances during the input video 206 and having the one or more features 120 subjected to secondary motion. Therefore, over multiple iterations, the secondary motion modeling system 116 generates and renders a synthesized motion video of the object, which includes the features 120 subjected to dynamic secondary motion induced by the motion of the object.

As described and depicted herein, the appearances 404 of the features 120 are generated, in part, by leveraging modular functions to generate intermediate representations of the features 120. For example, the machine learning shape decoder model 302 leverages a first modular function that is trained to generate a first intermediate representation of the features 120, e.g., the two-dimensional shapes 304. Further, the machine learning appearance decoder model leverages a second modular function that is trained to generate a second intermediate representation of the features 120, e.g., the surface normals 406. In this way, each modular function receives its own set of supervision signals, i.e., each of the models 302, 402 receives different input data. By learning the two-dimensional shapes 304 and the surface normals 406 of the features separately, the secondary motion modeling system renders secondary motion having increased plausibility, as compared to a typical end-to-end decoder comprised of one function that predicts the final appearance of the features 120. However, both sets of supervision signals received by the models 302, 402 include the three-dimensional motion descriptors 126, thereby enforcing coherence among the intermediate representations and resulting in a compact final representation 416.

Furthermore, the machine learning appearance decoder model 402 is a multi-task learning model. In other words, the machine learning appearance decoder model 402 performs multiple learning tasks concurrently—determining the surface normals 406 of the features 120 and generating the appearance 404 of the features 120. This enables the machine learning appearance decoder model 402 to exploit the commonalities and differences across the multiple learning tasks. By doing so, the machine learning appearance decoder model 402 improves learning efficiency and prediction accuracy for the task-specific functions of determining the surface normals 406 and generating the appearance 404, as compared to a decoder that trains the task-specific functions separately.

Moreover, the models 302, 402 are autoregressive learning models, meaning that the models 302, 402 receive, as supervision signals, one or more outputs from a previous iteration. By doing so, the models 302, 402 learn the dynamics of secondary motion (e.g., the correlation between the modeled features 120 of a posed object at a current time step and the modeled features 120 of the posed object at a previous time step), rather than memorizing a pose-specific appearance.

Figure 5:
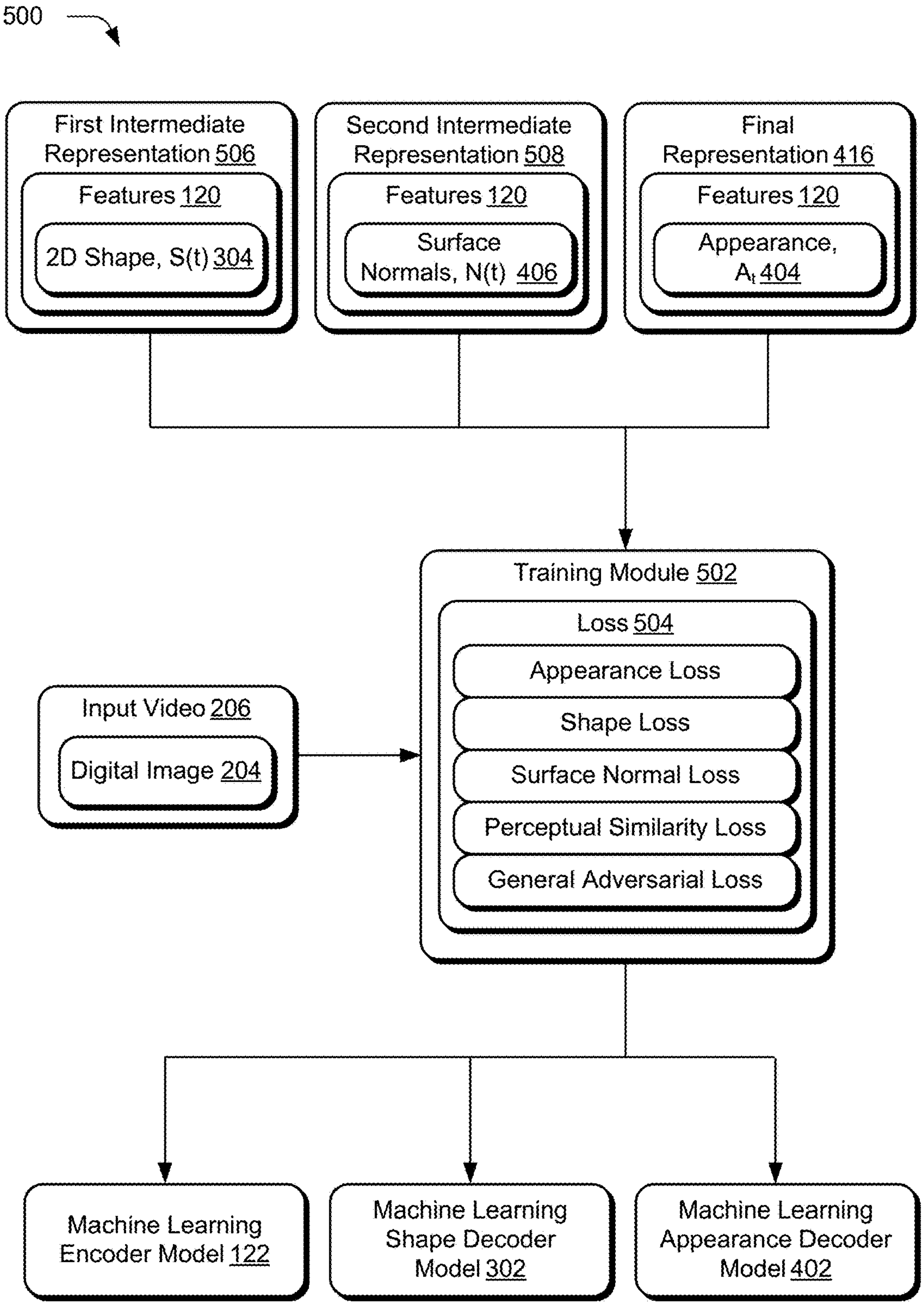
FIG. 5 depicts a system in an example implementation showing operation of a training module to train a machine learning encoder model, a machine learning shape decoder model, and a machine learning appearance decoder model.

FIG. 5 depicts a system 500 in an example implementation showing operation of a training module 502 to train the machine learning encoder model 122, the machine learning shape decoder model 302, and the machine learning appearance decoder model 402. Broadly, the machine learning models 122, 302, 402 utilize algorithms to learn from, and make predictions on, known data by analyzing the known data to learn to generate outputs that reflect patterns and attributes of the known data. In one or more implementations, the machine learning models 122, 302, 402 include one or more convolutional neural networks (CNN). A CNN is formed from layers of nodes (i.e., neurons) and includes various layers such as an input layer, an output layer, and one or more hidden layers such as convolutional layers, pooling layers, activation layers, fully connected layers, normalization layers, and so forth. Example architectures of the machine learning models 122, 302, 402 are discussed below with reference to FIGS. 8, 9, 10*a*, and 10*b*. During training, the training module 502 adjusts one or more weights associated with the layers of the machine learning models 122, 302, 402 to minimize a loss 504.

To do so, the training module 502 receives the input video 206 including the plurality of digital images 204 that depict the object in motion. Although the input video 206 provided as input to the training module 502 is described and depicted herein as being the same input video 206 provided as input to the secondary motion modeling system 116 during deployment of the models 122, 302, 402, it is to be appreciated that the training module 502 receives, as input, a different input video in some implementations. As previously discussed, the input video 206 is a monocular input video (e.g., captured by a single camera from a single viewpoint) that is less than sixty seconds in length.

In accordance with the described techniques, the secondary motion modeling system 116 is leveraged to generate a first intermediate representation 506 of the object including the two-dimensional shapes 304 of the features 120 mapped to the target three-dimensional object model 118, generate the second intermediate representation 508 of the object including the surface normals 406 of the features 120 mapped to the target three-dimensional object model 118, and generate the final representation 416 of the object including the appearances 404 of the features 120 mapped to the target three-dimensional object model 118. The first intermediate representation 506, the second intermediate representation 508, and the final representation 416 are received by the training module 502.

Furthermore, a digital image 204 from which the target three-dimensional object model 118 is generated is received by the training module 502. The features 120 modeled by the secondary motion modeling system 116 during training correspond to or include features of the object depicted in the digital image 204. By way of example, the features 120 modeled by the secondary motion modeling system 116 include a shirt that is worn by a human in the input video 206. Accordingly, the training module 502 is configured to adjust the weights of the machine learning models 122, 302, 402 based on comparisons of the first intermediate representation 506 to the object depicted in the corresponding digital image 204, the second intermediate representation 508 to the object depicted in the corresponding digital image 204, and the final representation 416 to the object depicted in the corresponding digital image 204.

By way of example, the loss 504 is represented by the following equation:

$$\mathcal{L} = \sum_{P,A \in D} \mathcal{L}_a + \lambda_s \mathcal{L}_s + \lambda_n \mathcal{L}_n + \lambda_n \mathcal{L}_n + \lambda_p \mathcal{L}_p + \lambda_g \mathcal{L}_g$$

In the equation above, $\mathcal{L}_a$ represents appearance loss, $\mathcal{L}_s$ represents shape loss, $\mathcal{L}_n$ represents surface normal loss, $\mathcal{L}_p$ represents perceptual similarity loss, and $\mathcal{L}_g$ represents general adversarial loss. Furthermore, $\lambda_s$, $\lambda_n$, $\lambda_p$, and $\lambda_g$ are the weights assigned to the various losses. Moreover, D is the training dataset including the ground truth object, P, depicted in the digital image 204 and the corresponding appearance A.

To determine the various losses, the training module 502 utilizes the following equations:

$$\mathcal{L}_a(P, A) = \|\hat{A} - A\|$$

$$\mathcal{L}_s(P, A) = \|\hat{s} - S(A)\|$$

$$\mathcal{L}_n(P, A) = \|\hat{n} - N(A)\|$$

$$\mathcal{L}_p(P, A) = \sum_i \|VGG_i(\hat{A}) - VGG_i(A)\|$$

$$\mathcal{L}_g(P, A) = E_{S(A),\hat{A}}[\log(D^*(S(A), A)] + E_{S(A),\hat{A}}[1 - \log(D^*(S(A), \hat{A})]$$

In the equations above, Â represents the appearance of the features 120 mapped to the target three-dimensional object model 118, or in other words, the final representation 416 of the object, ŝ represents the two-dimensional shape 304 of the features 120 mapped to the target three-dimensional object model 118, or in other words, the first intermediate representation 506 of the object, and n̂ represents the surface normals 406 of the features 120 mapped to the target three-dimensional object model 118, or in other words, the second intermediate representation 508 of the object. Further, S and N are the shape and surface normal estimates of the object depicted in the digital image 204, respectively. Therefore, the appearance loss is a difference in appearance between the object depicted in the digital image 204 and the final representation 416 of the object. Further, the shape loss is a difference in shape between the object depicted in the digital image 204 and the first intermediate representation 506 of the object. Moreover, the surface normal loss is defined based on surface normal differences between the object depicted in the digital image 204 and the second intermediate representation 508 of the object.

In accordance with the equations above, VGG is a feature extractor that computes perceptual features of objects depicted in digital images. Therefore, the perceptual similarity loss is the difference between the perceptual features of the object depicted in the digital image 204 and the perceptual features of the final representation 416 of the object. Moreover, D* is a PatchGan discriminator that validates the plausibility of the final representation 416 conditioned on the two-dimensional shape of the object depicted in the digital image 204.

After the loss 504 is computed, the training module 502 adjusts the weights of the machine learning models 122, 302, 402 to minimize the loss 504. Further, the training module 502 iteratively adjusts the weights of the machine learning models 122, 302, 402 for the object depicted in the digital image 204, and for the object depicted in different digital images of the input video 206. The weights of the machine learning models 122, 302, 402 are iteratively adjusted until the loss 504 converges to a minimum. Upon convergence, the machine learning models 122, 302, 402 are deployed in connection with the secondary motion modeling system 116 to generate a temporally coherent synthesized motion video that includes dynamic secondary motion, as discussed above.

Figure 6:
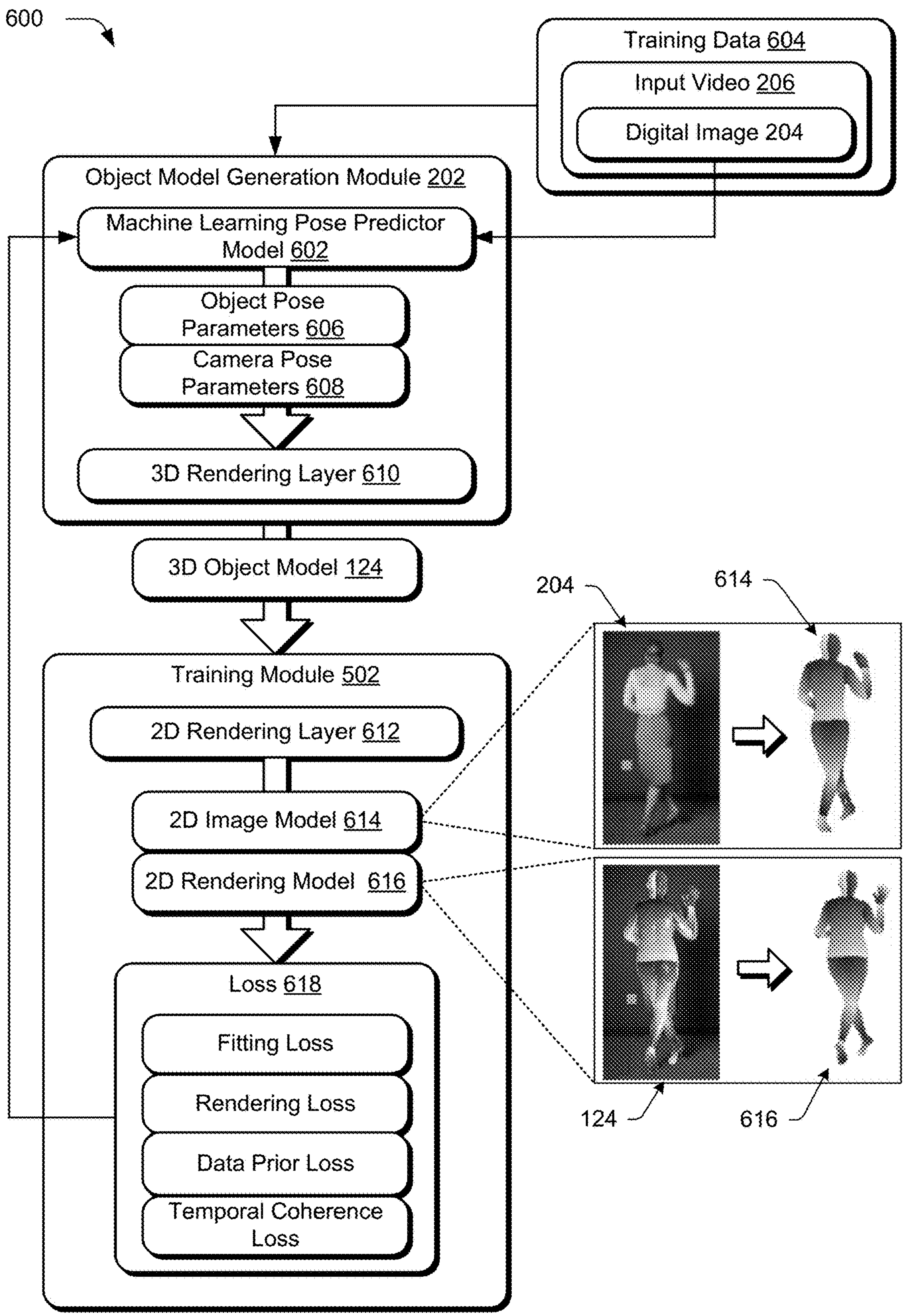
FIG. 6 depicts a system in an example implementation showing operation of a machine learning pose predictor model.

FIG. 6 depicts a system 600 in an example implementation showing operation of a machine learning pose predictor model 602. In particular, the system 600 depicts how the object model generation module 202 leverages the machine learning pose predictor model 602 to generate the three-dimensional object models 124, and how the machine learning pose predictor model 602 is trained. In the example system 600, training data 604 is received by the object model generation module 202 in the form of the input video 206 that includes the digital images depicting the object in motion. Although the training data 604 is described and depicted herein as including the same input video 206 provided as input to the secondary motion modeling system 116 during deployment of the machine learning pose predictor model 602, it is to be appreciated that the training data 604 includes a different input video in some implementations.

In accordance with the described techniques, the machine learning pose predictor model 602 receives, as input, a digital image 204 from the input video 206. The machine learning pose predictor model 602 is employed to determine object pose parameters 606 of the object depicted in the digital image 204. The object pose parameters 606 define a pose in which the object is situated in the corresponding digital image 204 based on angles between neighboring portions of the object and a degree of rotation for the object as a whole. By way of example, the object pose parameters 606 for a human figure include the angles of various joints of the human figure (e.g., the elbow joint angle which measures the angle between the upper arm and the lower arm) and the overall rotation of the human figure. The object pose parameters 606 also capture a degree of camera rotation relative to the object. The machine learning pose predictor model 602 further predicts camera pose parameters 608 which define a degree of camera translation relative to the object. In one or more implementations, the machine learning pose predictor model 602 is modeled as a tracking function $\theta_t$, $C_t = f_{track}(A_t)$, in which, $f_{track}$ is the machine learning pose predictor model 602 configured to determine object pose parameters 606, $\theta_t$, and camera pose parameters 608, $C_t$, based on the digital image 204, $A_t$.

The object pose parameters 606 and the camera pose parameters 608 are received, as input, by a three-dimensional rendering layer 610, which is employed to generate a corresponding three-dimensional object model 124 based on the object pose parameters 606 and the camera pose parameters 608. By way of example, given a shape of the object depicted in the digital image 204, the three-dimensional rendering layer 610 decodes the predicted parameters 606, 608 to determine a set of points representing the surface of the object. Accordingly, the three-dimensional rendering layer 610 renders the three-dimensional object model 124 at the determined set of points.

During training, the three-dimensional rendering layer 610 provides the three-dimensional object model 124 to the training module 502, which in the system 600 includes a two-dimensional rendering layer 612. The two-dimensional rendering layer 612 is configured to generate a two-dimensional image model 614 and a two-dimensional rendering model 616. The two-dimensional image model 614 is a two-dimensional representation of the object depicted in the digital image 204, whereas the two-dimensional rendering model 616 is a two-dimensional representation of the three-dimensional object model 124 rendered by the three-dimensional rendering layer 610. In the illustrated example, the two-dimensional image model 614 is a UV coordinate representation of the object as extracted from the digital image 204. In contrast, the two-dimensional rendering model 616 is a UV coordinate representation of the object extracted from the three-dimensional object model 124.

The training module 502 is configured to train the machine learning pose predictor model 602. The training is based, in part, on one or more comparisons between the two-dimensional representation of the three-dimensional object model 124 (e.g., the two-dimensional rendering model 616) and the two-dimensional representation of the object depicted in the digital image 204, e.g., the two-dimensional image model 614. By way of example, the training module 502 determines a loss 618 represented as $\mathcal{L}=\mathcal{L}_f+\lambda_r\mathcal{L}_r+\lambda_d\mathcal{L}_d+\lambda_t\mathcal{L}_t$, in which $\mathcal{L}_f$ represents fitting loss, $\mathcal{L}_r$ represents rendering loss, $\mathcal{L}_d$ represents data prior loss, and $\mathcal{L}_t$ represents temporal coherence loss. Furthermore, $\lambda_r$, $\lambda_d$, and $\lambda_t$ are the weights assigned to the various losses.

The fitting loss is further representable as $\mathcal{L}_f=\Sigma_{X\leftrightarrow x\in U}\|\Pi_p X-x\|$ in which U is the set of dense key points in the digital image 204, $x\in\mathbb{R}^2$, obtained from image-based dense UV map predictions. Further, X are the corresponding set of points representing the surface of the three-dimensional object model 124 as determined by the three-dimensional rendering layer 610. Moreover, $\Pi_p$ is a function of the camera pose parameters 608 that captures the three-dimensional object model 124 in the image plane from a viewpoint that corresponds to the viewpoint of the digital image 204. Given this, the fitting loss is the two-dimensional distance between the set of points representing the surface of the three-dimensional object model 124 and corresponding points in the two-dimensional image model 614.

The rendering loss is representable as $\mathcal{L}_r=\|g(W^{-1}p^t, C_t)-y\|$ in which $W^{-1}$ is a geometric transformation function that warps the three-dimensional object model 124, $p^t$, to a two-dimensional representation. Further, g is a rendering function that renders the UV coordinates from the two-dimensional representation of the three-dimensional object model 124 $W^{-1}p^t$ and based on the camera parameters $C_t$. Moreover, y represents the two-dimensional UV representation of the image 204. Accordingly, the rendering loss is the difference between the two-dimensional UV representation of the generated three-dimensional object model 124 (e.g., the rendering model 616) and the two-dimensional UV representation of the object depicted in the digital image 204, e.g., the image model 614.

The data prior loss is representable as $\mathcal{L}_d=\|\theta-\bar{\theta}\|+\|C-\bar{C}\|$, in which θ and C are the object pose parameters 606 and the camera pose parameters 608, respectively, determined for the digital image 204. Further, $\bar{\theta}$ and $\bar{C}$ are the initial object pose parameters and the initial camera pose parameters, respectively, initially determined for the digital image 204, e.g., in a previous iteration. Thus, the data prior loss is the difference between the object and camera pose parameters 606, 608 determined for the digital image 204 in a current iteration and the object and camera pose parameters determined for the digital image 204 in a previous or initial iteration.

The temporal coherence loss is representable as $\mathcal{L}_t=\|\theta_t-\theta_{t-1}\|+\|\theta_t-\theta_{t+1}\|+\|C_t-C_{t-1}\|+\|C_t-C_{t-1}\|$, in which $\theta_t$ and $C_t$ are the object pose parameters 606 and the camera pose parameters 608 determined for the digital image 204. Further, $\theta_{t-1}$ and $C_{t-1}$ are the object pose parameters and the camera pose parameters determined for a previous digital image (e.g., a previous frame of the input video 206). In addition, $\theta_{t+1}$ and $C_{t+1}$ are object pose parameters and the camera pose parameters determined for a subsequent digital image, e.g., a subsequent frame of the input video 206. Thus, the temporal coherence loss captures the camera pose parameter and object pose parameter differences between a current time instance and a previous time instance as well as between the current time instance and a subsequent time instance.

The loss 618 is determined in one example without using ground truth data, e.g., object pose parameters and camera pose parameters which are known to be true. To obtain such ground truth data in conventional techniques, considerable effort is typically required to track the parameters while the input video 206 is captured. For example, the ground truth object pose and camera pose parameters are determined by adding markers to the object while the input video 206 is captured, which identify particular locations on the surface of the object. Additionally or alternatively, the ground truth parameters are determined by capturing the input video 206 from multiple viewpoints, e.g., using multiple cameras. In the techniques described herein, however, the training module 502 is trains the machine learning pose predictor model 602 without use of these additional efforts to track ground truth object pose and camera pose parameters, thereby improving operation of processing devices that implement these techniques.

In one or more implementations, the machine learning pose predictor model 602 includes one or more CNNs. As noted above, a CNN is formed from layers of nodes (i.e., neurons) and includes various layers such as an input layer, an output layer, and one or more hidden layers such as convolutional layers, pooling layers, activation layers, fully connected layers, normalization layers, and so forth. An example architecture for the machine learning pose predictor model 602 is discussed below with reference to FIG. 11. During training, the training module 502 adjusts one or more weights associated with the layers of the machine learning pose predictor model 602 to minimize the loss 618. In particular, the training module 502 iteratively adjusts the weights of the machine learning pose predictor model 602 for the object depicted in the digital image 204, and for the object depicted in different digital images of the input video 206. The weights of the machine learning pose predictor model 602 are iteratively adjusted until the loss 618 converges to a minimum. Upon convergence, the machine learning pose predictor model 602 is deployed in connection with the object model generation module 202 to generate the three-dimensional object models 124, as discussed above.

Figure 7:
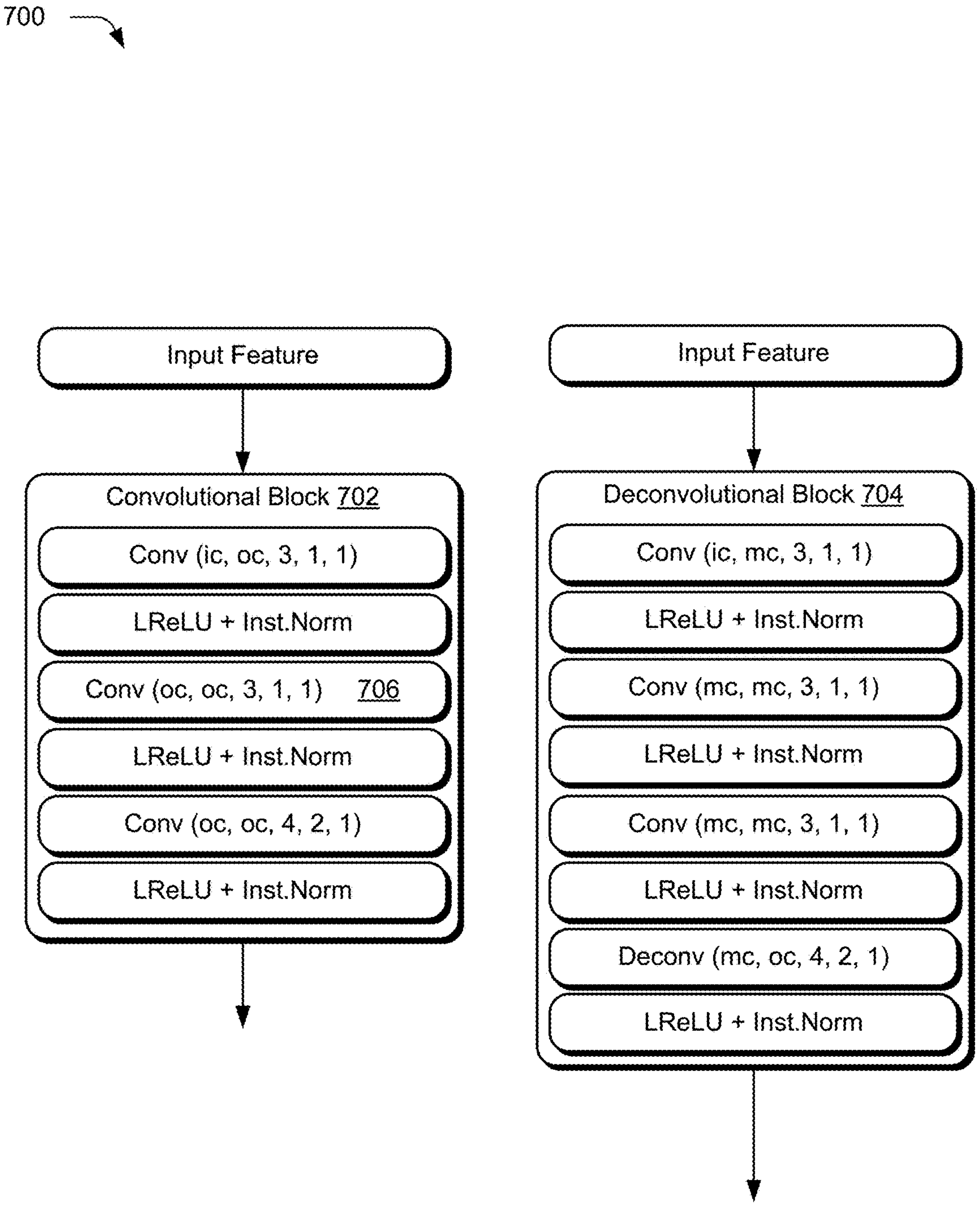
FIG. 7 depicts a non-limiting example of convolutional and deconvolutional blocks that are implementable to carry out the described techniques.

FIG. 7 depicts a non-limiting example 700 of convolutional and deconvolutional blocks that are implementable to carry out the described techniques. Example convolutional block 702 and example deconvolutional block 704 are implementable in any one of the example convolutional neural network architectures depicted and described below with reference to FIGS. 8-11. In the example 700, the notation "ic" refers to a number of input channels for the block, the notation "oc" refers to a number of output channels for the block, and "mc" refers to a number of medium channels for the block. The convolutional block 702 is defined as C-Blk (ic, oc) and the deconvolutional block 704 is defined as D-blk (ic, mc, oc) in FIGS. 8-11.

The convolutional and deconvolutional layers are constructed based on the following parameters (A, B, C, D, E), in which A represents a number input channels for the layer, B represents a number of output channels for the layer, C represents a filter size, D represents a stride, and E represents the size of the zero padding. Thus, the convolutional layer 706 has the following parameters: a number of input channels and output channels that is equal to the number of output channels for the convolutional block 702, a filter size of three, a stride of one, and a zero padding with a size of one. Furthermore, the convolutional and deconvolutional blocks 702, 704 include a number of activation/normalization layers that utilize a Leaky Rectified Linear Unit (LReLU) activation function and an instance normalization function (Inst.Norm).

Figure 8:
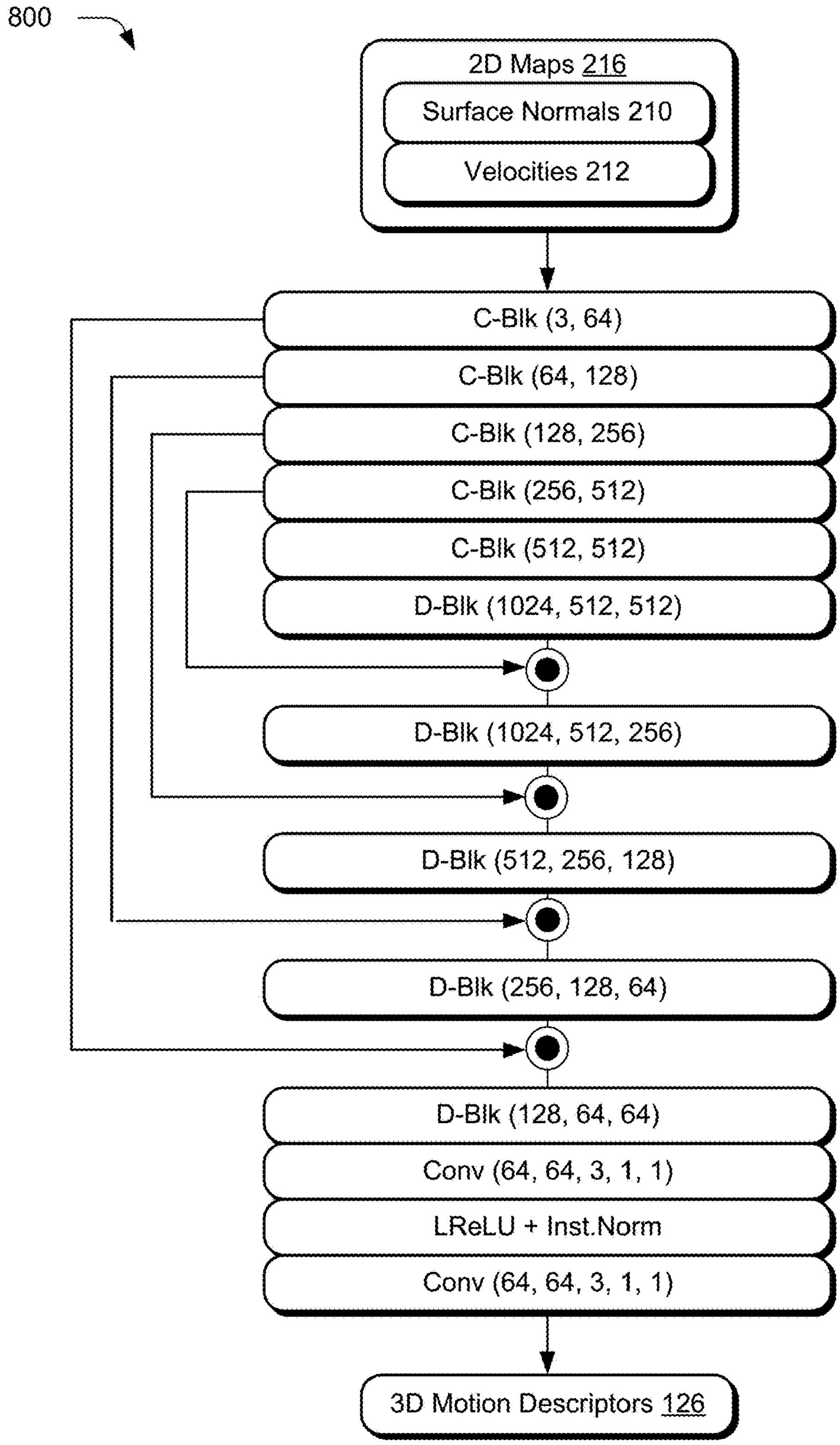
FIG. 8 depicts a non-limiting example of a network architecture for the machine learning encoder model.

FIG. 8 depicts a non-limiting example 800 of a network architecture for the machine learning encoder model 122. As shown, the machine learning encoder model 122 receives, as input, the two-dimensional map 216 in which each pixel represents an individual point on the surface of the target three-dimensional object model 118 and includes the determined surface normal 210 and velocities 212 for the individual point. The two-dimensional map 216 is propagated through a series of convolutional blocks, deconvolutional blocks, convolutional layers, and activation/normalization layers, such as those discussed with reference to FIG. 7. As shown, the output for the machine learning encoder model 122 is the three-dimensional motion descriptors 126

Figure 9:
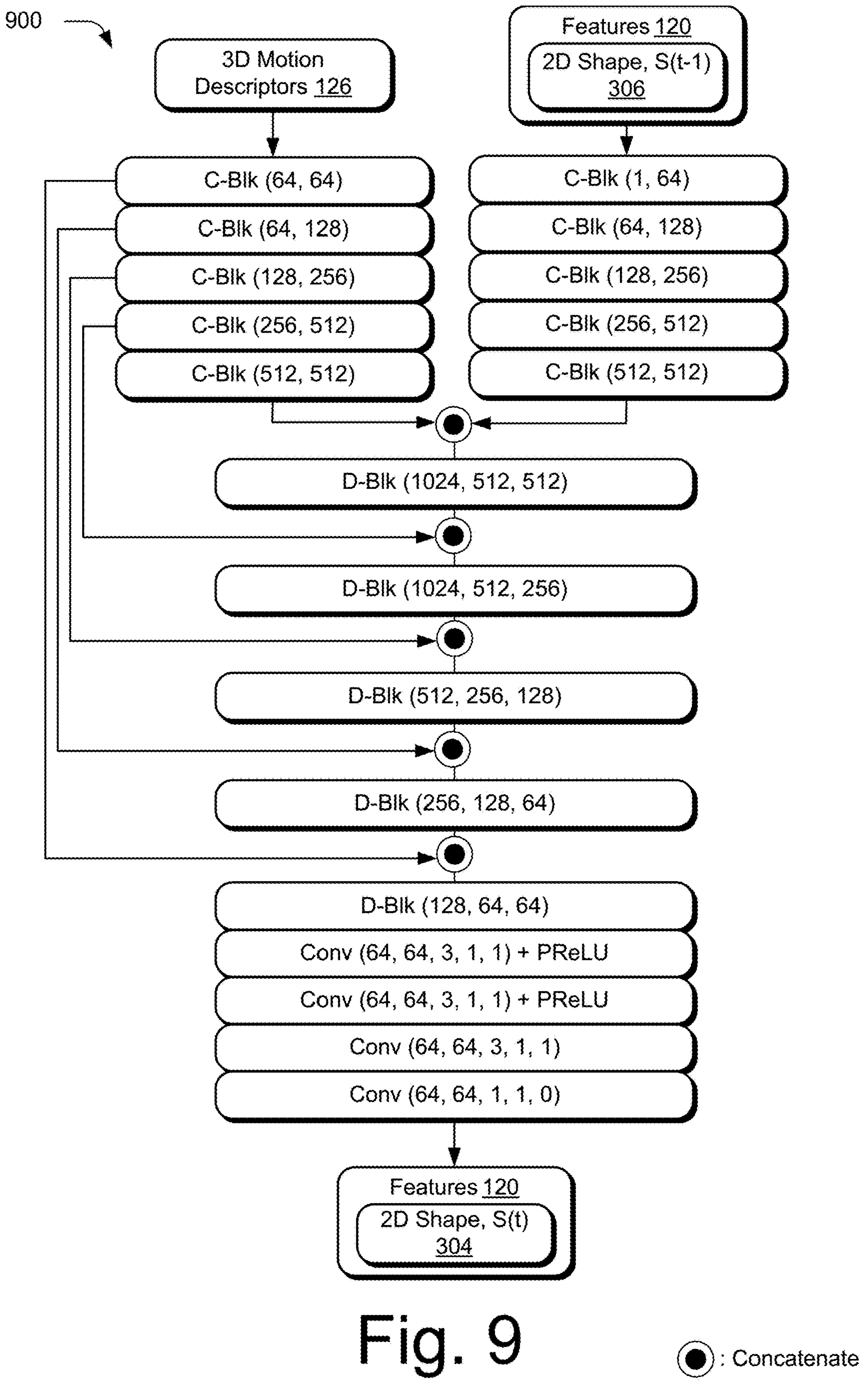
FIG. 9 depicts a non-limiting example of a network architecture for the machine learning shape decoder model.

FIG. 9 depicts a non-limiting example 900 of a network architecture for the machine learning shape decoder model 302. As shown, the machine learning shape decoder model 302 receives, as input, the three-dimensional motion descriptors 126 and the two-dimensional shapes 306 of the features 120 determined for a three-dimensional object model 124 of a previous time instance. The three-dimensional motion descriptors 126 and the two-dimensional shapes 306 are propagated through a series of convolutional blocks, deconvolutional blocks, and convolutional layers, such as those discussed with reference to FIG. 7. Further, the non-limiting example 900 includes convolutional/activation layers that utilize a Parametric Rectified Linear Unit (PReLU) activation function. As shown, the output for the machine learning shape decoder model 302 is the two-dimensional shapes 304 of the features 120 to be mapped to the target three-dimensional object model 118.

Figure 10A:
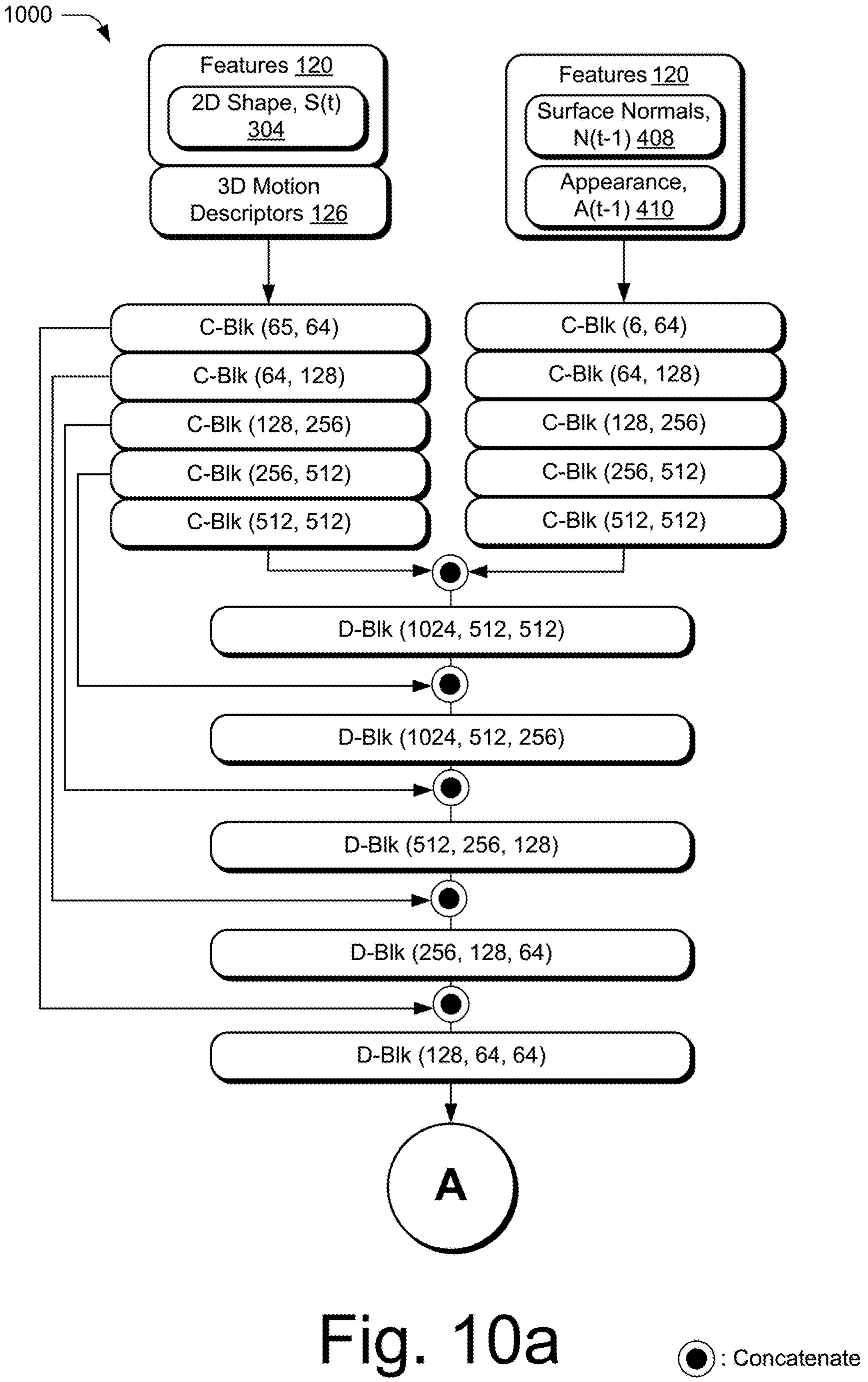
FIGS. 10*a* and 10*b* depict a non-limiting example of a network architecture for the machine learning appearance decoder model.
Figure 10B:
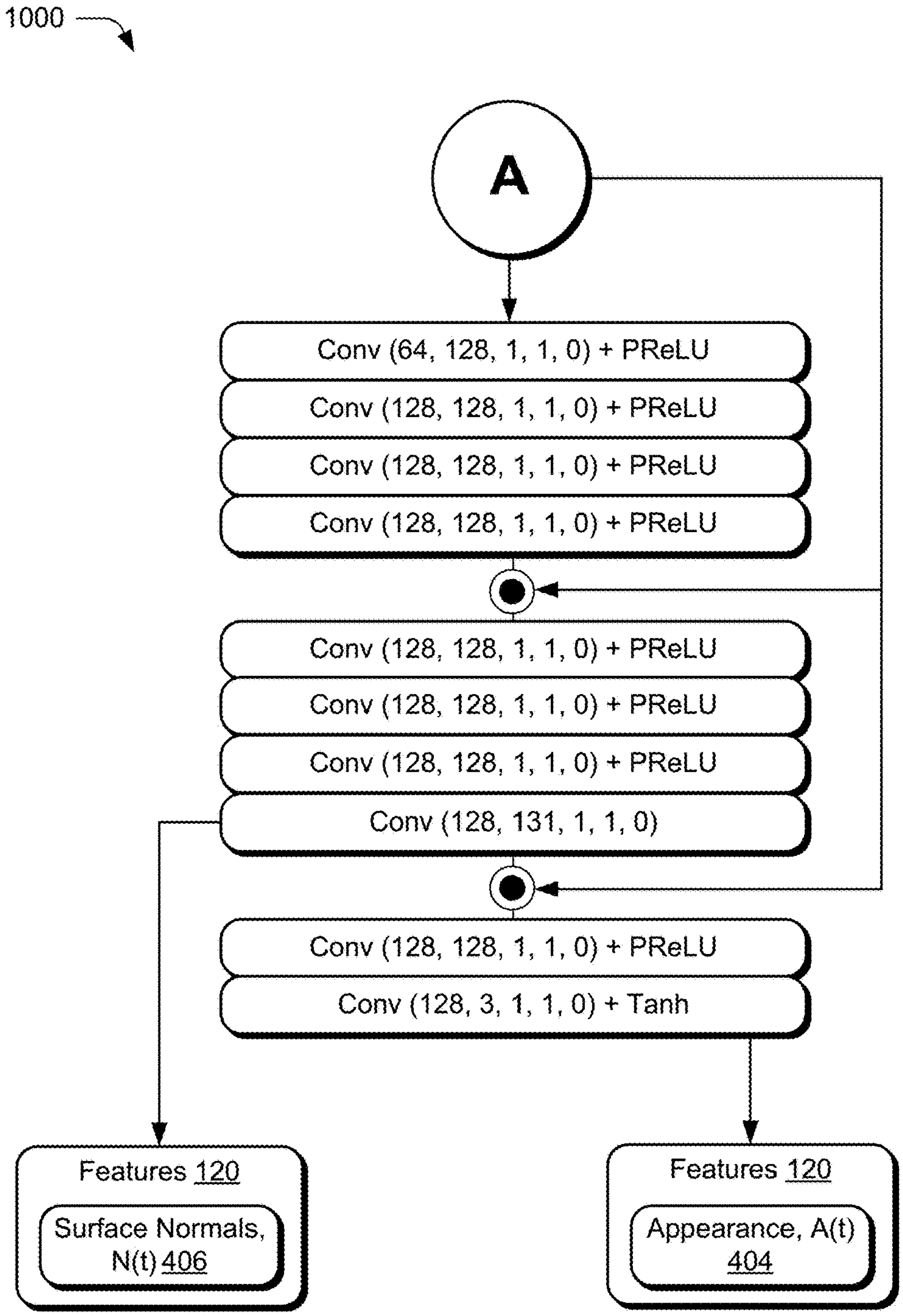

FIGS. 10*a* and 10*b* depict a non-limiting example 1000 of a network architecture for the machine learning appearance decoder model 402. As shown, the machine learning appearance decoder model 402 receives, as input, the two-dimensional shapes 304 of the features 120 to be mapped to the target three-dimensional object model 118, the three-dimensional motion descriptors 126, and the surface normals 408 and appearances 410 of the features 120 determined for a three-dimensional object model 124 of a previous time instance. The input data is propagated through a series of convolutional blocks, deconvolutional blocks, and convolutional layers, such as those discussed with reference to FIG. 7. Further, the non-limiting example 1000 includes convolutional/activation layers that utilize a Parametric Rectified Linear Unit (PReLU) or a hyperbolic tangent (Tanh) activation function. As shown, the machine learning appearance decoder model 402 outputs the surface normals 406 for the features 120 and the appearances 404 for the features 120.

Figure 11:
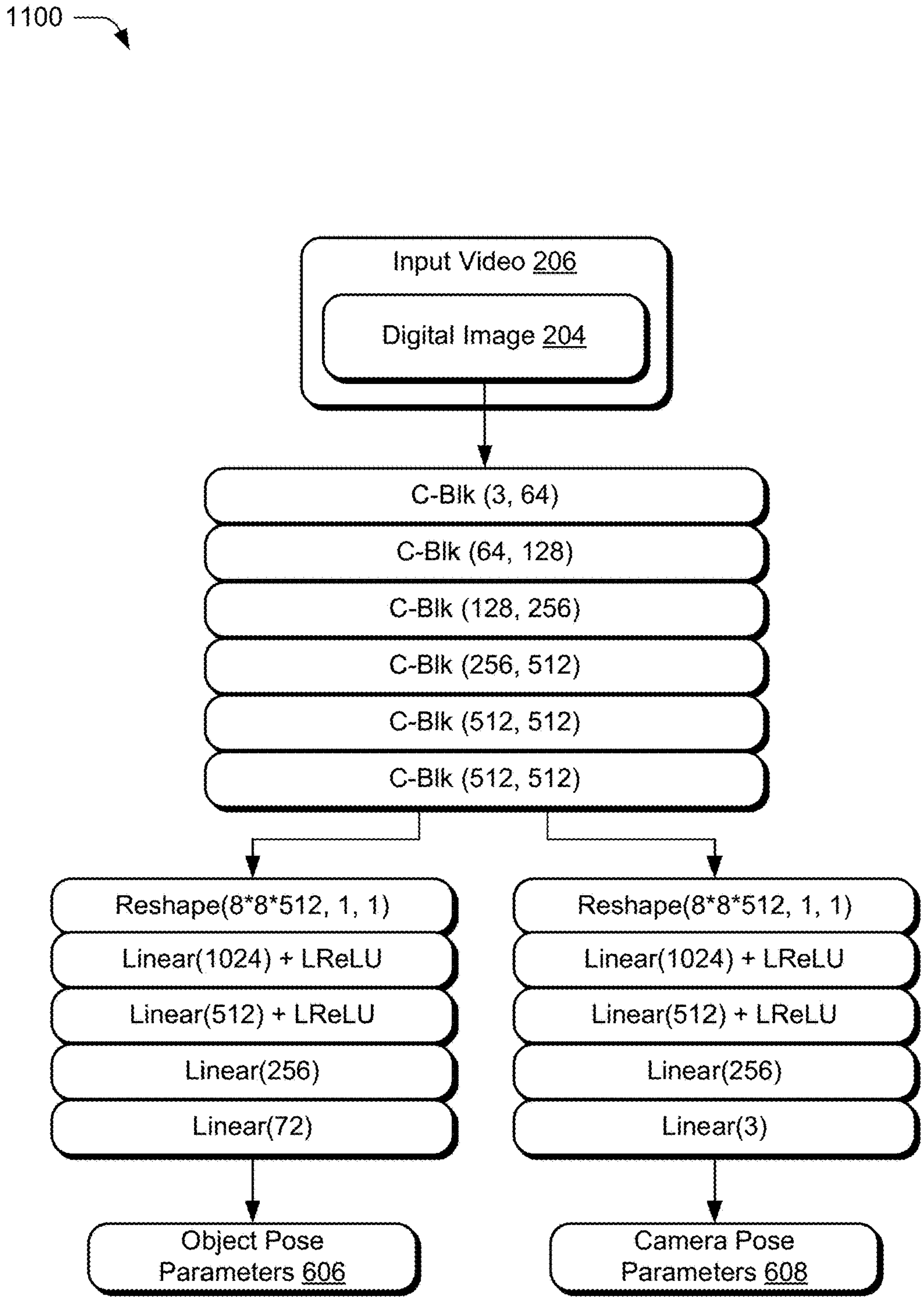
FIG. 11 depicts a non-limiting example of a network architecture for the machine learning pose predictor model.
Figure 12:
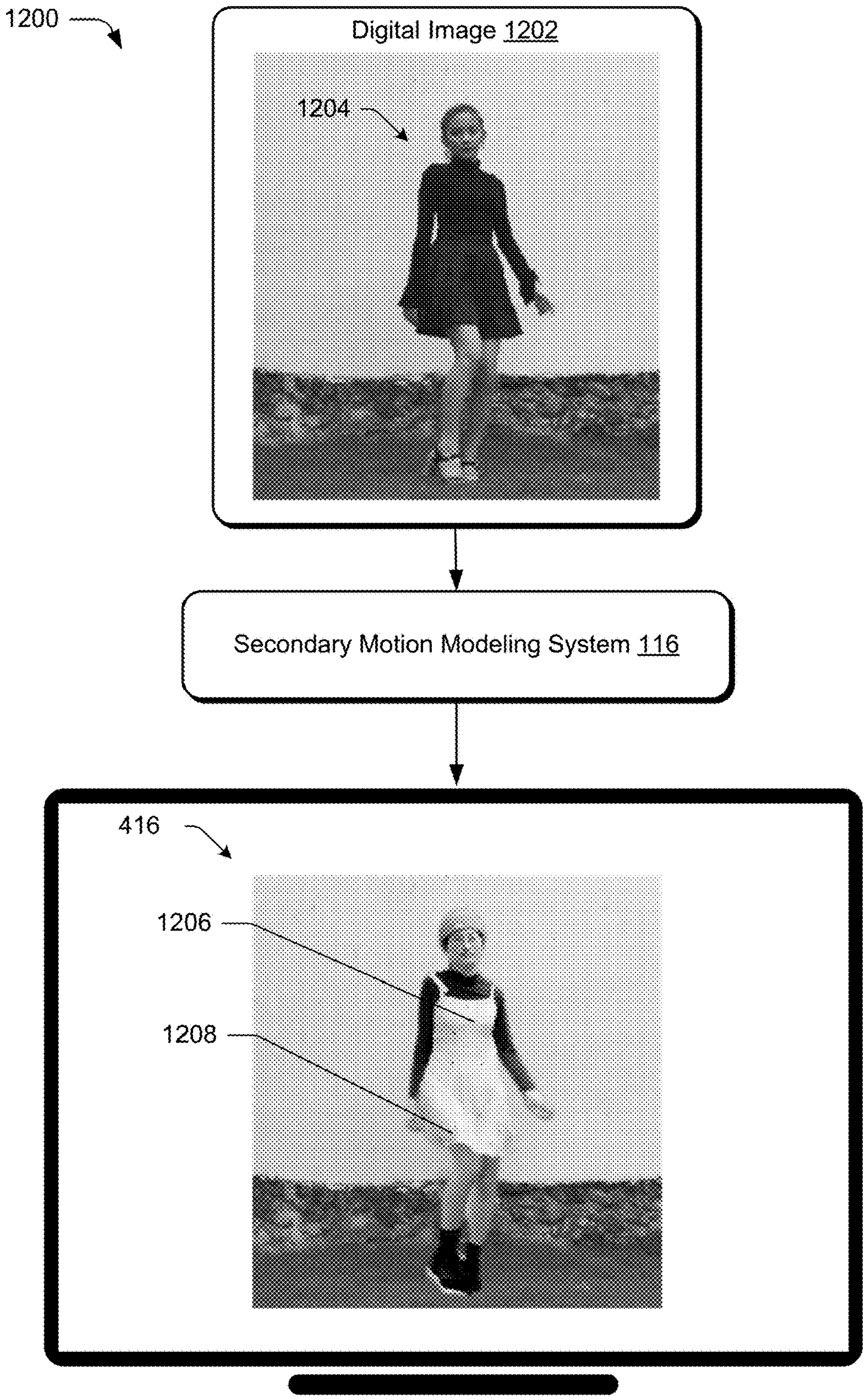
FIG. 12 depicts a non-limiting example for transferring motion from an object depicted in a digital image to a target three-dimensional object model having one or more features not depicted in the digital image in accordance with the described techniques.

FIG. 11 depicts a non-limiting example 1100 of a network architecture for the machine learning pose predictor model 602. As shown, the machine learning pose predictor model 602 receives, as input, a digital image 204 included as part of an input video 206. The digital image is passed through a series of convolutional blocks, such as those discussed with reference to FIG. 7. Further, the non-limiting example 1100 includes reshape layers, linear/activation layers, and linear layers. As shown, the machine learning pose predictor model 602 outputs the object pose parameters 606 and the camera pose parameters FIG. 12 depicts a non-limiting example 1200 for transferring motion from an object depicted in a digital image to a target three-dimensional object model having one or more features not depicted in the digital image in accordance with the described techniques. In the example 1200, the secondary motion modeling system 116 receives the input video 206 that includes a digital image 1202 depicting an object 1204, which in the illustrated example 1200, is a human figure. The secondary motion modeling system 116 is employed to learn the dynamics of secondary motion based on the input video 206 in accordance with described techniques. Based on the learned dynamics, the secondary motion modeling system 116 renders a final representation 416 of the object 1204 depicted in the digital image 1202 in accordance with the described techniques.

As shown, the final representation 416 of the object includes features 120 which are not included in the digital image 1202. By way of example, the final representation 416 of the object 1204 includes a top article of clothing 1206 that is a top portion of a dress with a long sleeve shirt underneath. In contrast, the object 1204 depicted in the digital image 1202 includes a different long sleeve shirt with a turtleneck. In addition, the final representation 416 of the object 1204 includes a bottom article of clothing 1208 that is a bottom portion of the dress, whereas the object 1204 depicted in the digital image 1202 includes a separate skirt.

Accordingly, the secondary motion modeling system 116, over multiple iterations, is configured to transfer motion depicted in the input video 206 to a synthesized motion video of the object, which includes one or more features 120 that are different or otherwise not depicted in the input video 206. In one or more implementations, the secondary motion of these features 120 differs from the secondary motion depicted in the input video 206. By way of example, loosely fitting clothing incurs increased amounts of secondary motion than that exhibited by tightly fitting clothing Given this, the secondary motion modeling system 116 models secondary motion which differs from the secondary motion depicted in the corresponding input video 206.

Figure 13:
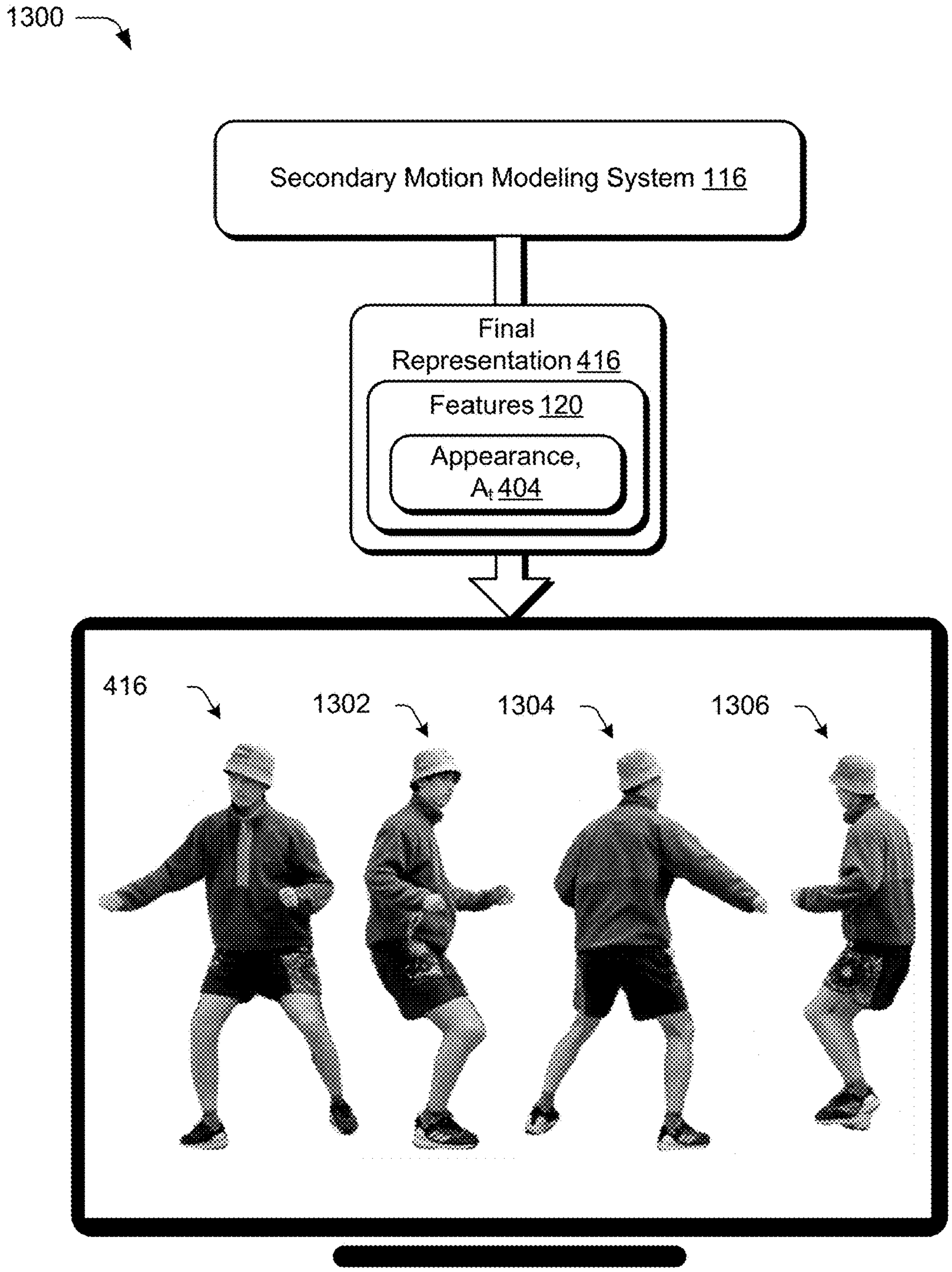
FIG. 13 depicts a non-limiting example for novel view synthesis in accordance with the described techniques.

FIG. 13 depicts a non-limiting example 1300 for novel view synthesis in accordance with the described techniques. In the example 1300, the secondary motion modeling system 116 renders a final representation 416 of the object that includes the features 120 having the generated appearance 404 mapped to the target three-dimensional object model 118. In particular, the final representation 416 of the object is rendered from a viewpoint that corresponds to a viewpoint from which the input video 206 was captured. In accordance with the illustrated example, the input video 206 is captured from a single viewpoint, e.g., using only one camera. Despite this, the secondary motion modeling system 116 is configured to render the final representation 416 from a plurality of different viewpoints. To do so, the secondary motion modeling system 116 receives user input via the user interface 110 of the computing device 102 to rotate the final representation 416 of the object. In response, the secondary motion modeling system 116 renders the final representation 416 of the object from multiple different viewpoints 1302, 1304, 1306 that are not captured in the input video 206. As a result, the secondary motion modeling system 116 renders object poses and secondary motion that were not shown to the machine learning models 122, 302, 402 during training.

Thus, in one or more implementations, the secondary motion modeling system 116 is configured to render unseen secondary motion, such as rendering new or different features 120 being subjected to secondary motion and/or rendering secondary motion that was occluded from view in the input video 206. By using three-dimensional object models 124 and three-dimensional motion descriptors 126 as a basis for learning and modeling secondary motion, the described techniques support increased accuracy in rendering unseen secondary motion, as compared to conventional techniques which utilize two-dimensional object models and two-dimensional motion.

Figure 14:
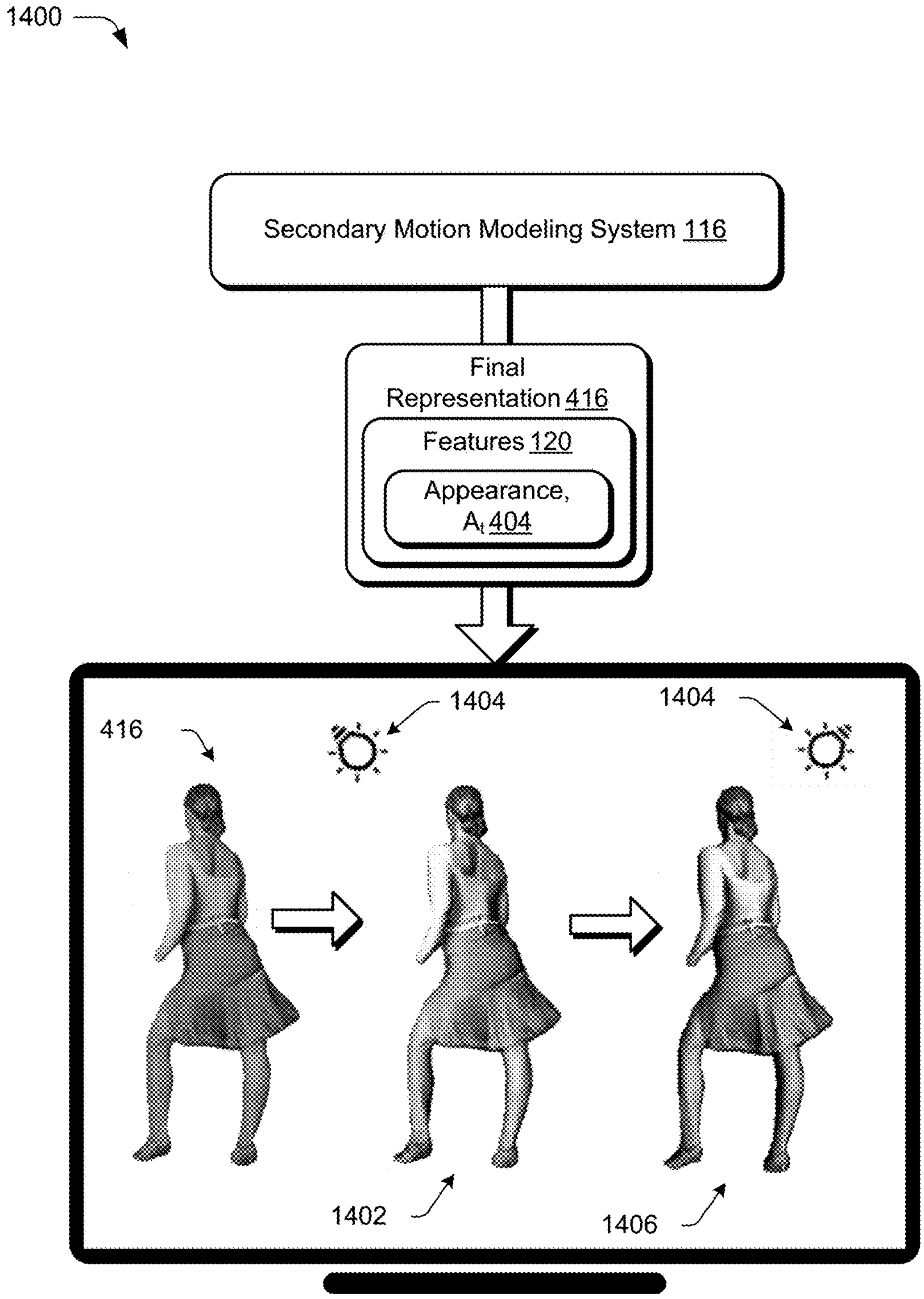
FIG. 14 depicts a non-limiting example for image-based relighting in accordance with the described techniques.
Figure 15:
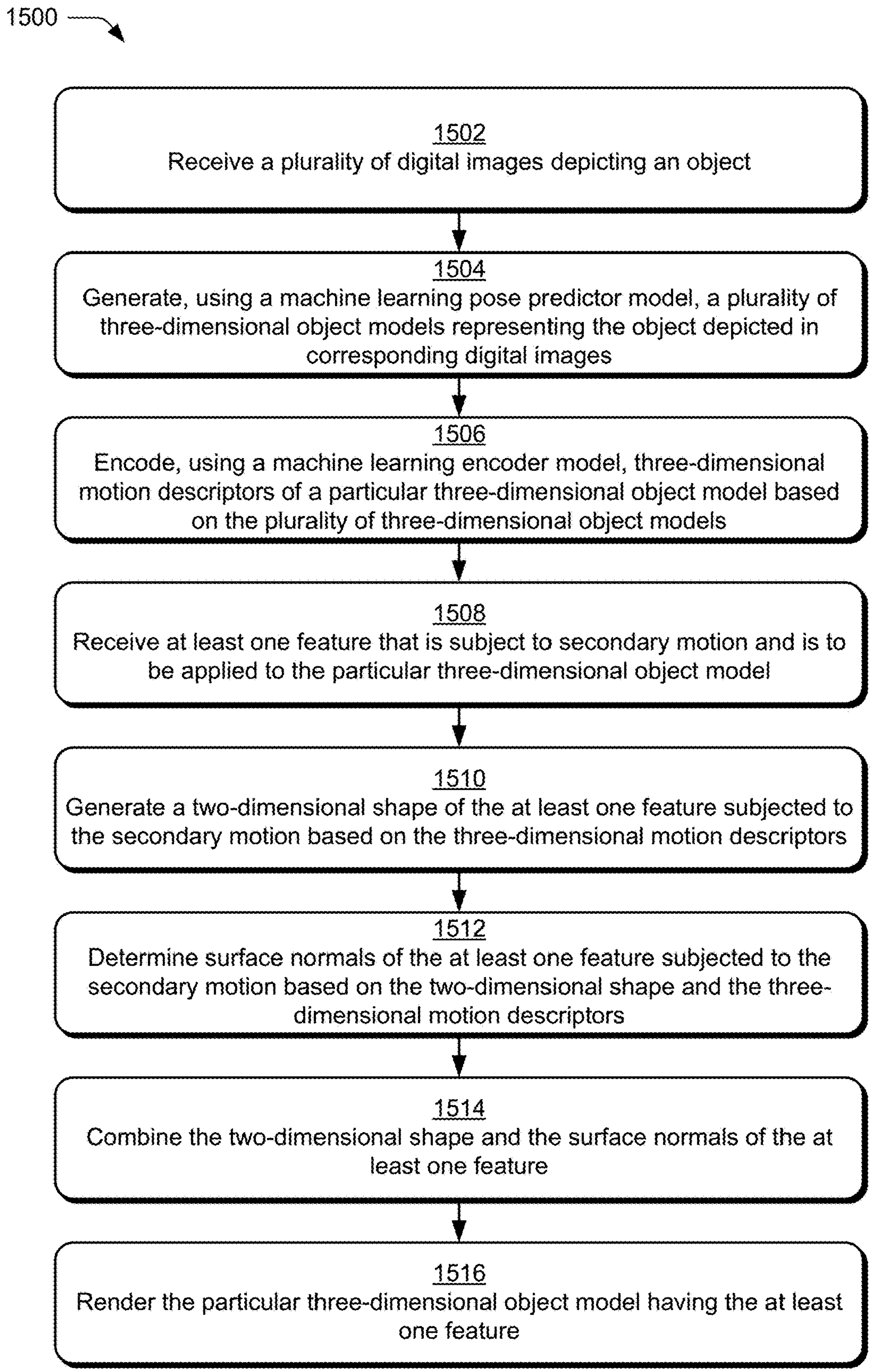
FIG. 15 is a flow diagram depicting a procedure in an example implementation for modeling secondary motion based on three-dimensional object models.

FIG. 14 depicts a non-limiting example 1400 for image-based relighting in accordance with the described techniques. In the example 1400, the secondary motion modeling system 116 renders a final representation 416 of the object that includes the features 120 having the generated appearance 404 mapped to the target three-dimensional object model 118. As shown at 1402, the secondary motion modeling system 116 receives a user input via the user interface 110 of the computing device 102 to place a lighting source 1404 at a first location relative to the final representation 416 of the object. In response, the secondary motion modeling system 116 determines locations on the surface of the object where shading is caused by the determined surface normals 406. By way of example, the secondary motion modeling system 116 identifies locations on the surface of the object having surface normals 406 which face at least partially away from the lighting source 1404. Further, the secondary motion modeling system 116 modifies the colors of the features at the identified locations to model the shading induced by the surface normals 406.

As further shown at 1406, the secondary motion modeling system 116 receives user input to move the lighting source 1404 to a second location relative to the final representation 416 of the object. In response, the secondary motion modeling system 116 identifies different locations on the surface of the object where shading is caused by the surface normals 406 (e.g., where the surface normals 406 face at least partially away from the lighting source 1404), and modifies colors of the features 120 at the different locations. The above-described image-based relighting application is made possible by the generation of the intermediate representation of the object that includes the features 120 having the determined surface normals 406 mapped to the target three-dimensional object model 118. Since conventional techniques fail to generate such an intermediate representation, the image-based relighting application discussed above is not possible for conventional techniques.

Example System and Device

Figure 16:
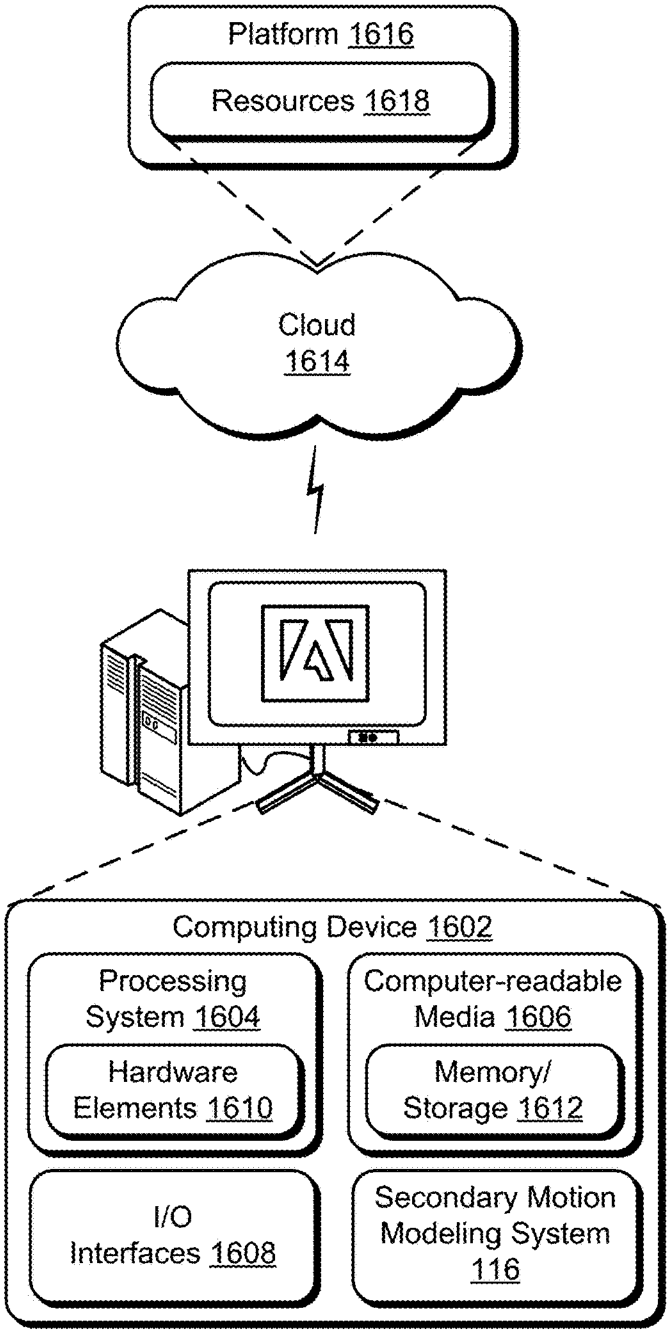
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that implement the various techniques described herein. This is illustrated through inclusion of the secondary motion modeling system 116. The computing device 1602 is configurable, for example, as a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware elements 1610 that are configurable as processors, functional blocks, and so forth. This includes implementation in hardware as an application specific integrated circuit or other logic device formed using one or more semiconductors. The hardware elements 1610 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1606 is illustrated as including memory/storage 1612. The memory/storage 1612 represents memory/storage capacity associated with one or more computer-readable media. The memory/storage 1612 includes volatile media (such as random access memory (RAM)) and/or nonvolatile media (such as read only memory (ROM), Flash memory, optical disks, magnetic disks, and so forth). The memory/storage 1612 includes fixed media (e.g., RAM, ROM, a fixed hard drive, and so on) as well as removable media (e.g., Flash memory, a removable hard drive, an optical disc, and so forth). The computer-readable media 1606 is configurable in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1610. The computing device 1602 is configured to implement particular instructions and/or functions corresponding to the software and/or hardware modules. Accordingly, implementation of a module that is executable by the computing device 1602 as software is achieved at least partially in hardware, e.g., through use of computer-readable storage media and/or hardware elements 1610 of the processing system 1604. The instructions and/or functions are executable/operable by one or more articles of manufacture (for example, one or more computing devices 1602 and/or processing systems 1604) to implement techniques, modules, and examples described herein.

The techniques described herein are supported by various configurations of the computing device 1602 and are not limited to the specific examples of the techniques described herein. This functionality is also implementable all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 abstracts resources and functions to connect the computing device 1602 with other computing devices. The platform 1616 also serves to abstract scaling of resources to provide a corresponding level of scale to encountered demand for the resources 1618 that are implemented via the platform 1616. Accordingly, in an interconnected device embodiment, implementation of functionality described herein is distributable throughout the system 1600. For example, the functionality is implementable in part on the computing device 1602 as well as via the platform 1616 that abstracts the functionality of the cloud 1614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a plurality of three-dimensional object models representing an object in primary motion;

encoding, by the processing device and using one or more machine learning models, three-dimensional motion descriptors of a particular three-dimensional object model based on the plurality of three-dimensional object models;

synthesizing, by the processing device and using the one or more machine learning models, a two-dimensional silhouette of at least one three-dimensional feature to which the particular three-dimensional object model is physically connected based on the three-dimensional motion descriptors, the two-dimensional silhouette subjected to secondary motion that is different from and induced by the primary motion;

modeling, by the processing device and using the one or more machine learning models, the at least one three-dimensional feature subjected to the secondary motion based on the three-dimensional motion descriptors and the two-dimensional silhouette; and rendering, by the processing device, the particular three-dimensional object model having the at least one three-dimensional feature.

2. The method of claim 1, further comprising:

receiving, by the processing device, a plurality of digital images depicting the object; and generating, by the processing device and using an additional machine learning model, the plurality of three-dimensional object models representing the object depicted in corresponding digital images.

3. The method of claim 2, further comprising:

generating, by the processing device, training data by extracting first two-dimensional representations of the object from the plurality of three-dimensional object models and extracting second two-dimensional representations of the object from the plurality of digital images; and training, by the processing device, the additional machine learning model using the training data by comparing the first two-dimensional representations to the second two-dimensional representations.

4. The method of claim 2, wherein the plurality of digital images are captured by a single camera from a single viewpoint, the three-dimensional motion descriptors describe different motion characteristics for different portions of a surface of the particular three-dimensional object model, and the different portions include at least one portion of the particular three-dimensional object model corresponding to a location of the object that is occluded from the single viewpoint captured by the single camera.

5. The method of claim 2, wherein the generating includes:

generating object pose parameters and camera pose parameters of the plurality of digital images, the object pose parameters describing a pose in which the object is situated, and the camera pose parameters describing a degree of camera translation relative to the object; and generating the plurality of three-dimensional object models based on the object pose parameters and the camera pose parameters.

6. The method of claim 1, wherein the three-dimensional motion descriptors describe surface normals and velocities of corresponding portions of the particular three-dimensional object model.

7. The method of claim 6, wherein the surface normals of the three-dimensional motion descriptors are encoded based on spatial derivatives of the corresponding portions of the particular three-dimensional object model, and the velocities of the three-dimensional motion descriptors are encoded based on temporal derivatives of the corresponding portions of the plurality of three-dimensional object models.

8. The method of claim 6, wherein the particular three-dimensional object model is generated from a digital image depicting the object at a particular time step during an input video, and the three-dimensional motion descriptors include the velocities of the corresponding portions of the particular three-dimensional object model over multiple previous time steps of the input video.

9. The method of claim 1, wherein the modeling includes determining surface normals of the at least one three-dimensional feature subjected to the secondary motion based on the two-dimensional silhouette and the three-dimensional motion descriptors.

10. The method of claim 9, wherein the modeling includes combining a first intermediate representation of the at least one three-dimensional feature including the two-dimensional silhouette and a second intermediate representation of the at least one three-dimensional feature including the surface normals.

11. The method of claim 9, wherein the particular three-dimensional object model is generated from a digital image depicting the object at a particular time step during an input video, and the surface normals are determined based on the three-dimensional motion descriptors describing motion characteristics of the object at the particular time step.

12. The method of claim 1, wherein the rendering includes mapping the at least one three-dimensional feature subjected to the secondary motion to the particular three-dimensional object model.

13. The method of claim 1, wherein the plurality of three-dimensional object models are generated from a plurality of digital images depicting the object, the method further comprising training the one or more machine learning models by comparing the particular three-dimensional object model having the at least one three-dimensional feature to a digital image from which the particular three-dimensional object model was generated, the digital image depicting the object physically connected to at least one depicted feature that corresponds to the at least one three-dimensional feature.

14. The method of claim 1, wherein the two-dimensional silhouette captures deformations to an outline of the at least one three-dimensional feature induced by the primary motion.

15. A system comprising:

a memory component; and a processing device coupled to the memory component, the processing device to perform operations including:

receiving a plurality of three-dimensional object models representing an object in primary motion;

encoding, using one or more machine learning models, surface normals and velocities of corresponding portions of a particular three-dimensional object model based on the plurality of three-dimensional object models;

synthesizing, using the one or more machine learning models, a two-dimensional silhouette of at least one three-dimensional feature to which the particular three-dimensional object model is physically connected based on the surface normals and the velocities, the two-dimensional silhouette subjected to secondary motion that is different from and induced by the primary motion;

modeling, using the one or more machine learning models, the at least one three-dimensional feature subjected to the secondary motion based on the surface normals, the velocities, and the two-dimensional silhouette; and rendering the particular three-dimensional object model having the at least one three-dimensional feature.

16. The system of claim 15, wherein the encoding includes recording the surface normals and the velocities in a two-dimensional map, each pixel in the two-dimensional map representing a corresponding portion of the particular three-dimensional object model and being encoded with a surface normal and a velocity.

17. The system of claim 16, wherein the encoding includes projecting the pixels of the two-dimensional map onto the particular three-dimensional object model.

18. The system of claim 16, wherein the encoding includes segmenting the two-dimensional map into patches representing interconnected portions of the object that move independently of one another.

19. A non-transitory computer-readable medium storing executable instructions, which when executed by a processing device, cause the processing device to perform operations comprising:

receiving three-dimensional motion descriptors relating to a particular three-dimensional object model of an object in primary motion;

receiving at least one feature that is subject to secondary motion to be applied to the particular three-dimensional object model;

synthesizing a two-dimensional silhouette of the at least one feature modeled as physically connected to the particular three-dimensional object model and subjected to the secondary motion based on the three-dimensional motion descriptors, the secondary motion being different from and induced by the primary motion;

determining surface normals of the at least one feature subjected to the secondary motion based on the three-dimensional motion descriptors and the two-dimensional silhouette; and modeling the at least one feature subjected to the secondary motion by combining the two-dimensional silhouette and the surface normals.

20. The non-transitory computer-readable medium of claim 19, wherein the two-dimensional silhouette is generated by a first machine learning model and the surface normals are determined by a second machine learning model, the first and second machine learning models receiving, as conditioning, different sets of supervision signals to output the two-dimensional silhouette and the surface normals, respectively.

* * * * *